United States Patent [19]
Azarya et al.

[11] Patent Number: 5,978,578
[45] Date of Patent: Nov. 2, 1999

[54] OPENBUS SYSTEM FOR CONTROL AUTOMATION NETWORKS

[76] Inventors: Arnon Azarya, 4 Yehuda Street, Ramat Hasharon 47311; Yitzhak Azarya, 5 Mivtza Sinai Street, Kiriat Ata 28000, both of Israel

[21] Appl. No.: 08/790,974

[22] Filed: Jan. 30, 1997

[51] Int. Cl.⁶ .................................................... G06F 9/45
[52] U.S. Cl. ........................ 395/701; 395/706; 395/705; 364/130
[58] Field of Search .................................... 364/130, 191, 364/468.09, 488.1; 395/3, 50, 60, 61, 200.83, 701, 705, 706, 821

[56] References Cited

U.S. PATENT DOCUMENTS

| | | | |
|---|---|---|---|
| 5,043,929 | 8/1991 | Kramer et al. | 364/578 |
| 5,412,757 | 5/1995 | Endo | 364/140 |
| 5,428,525 | 6/1995 | Cappelaere et al. | 364/140 |
| 5,623,652 | 4/1997 | Vora et al. | 395/610 |
| 5,757,640 | 5/1998 | Morson | 364/131 |

OTHER PUBLICATIONS

Jim Esch, "A Fine MES", Byte, Dec. 1995.
Nick Jones et al., "Closer Look at DeviceNet", Visual Automation Inc., Oct. 1996.
Greg Meinert, "Openness for Automation Networks", ISA Services Inc., Dec. 1995.
Philip Black, "LAN Technology With Smart Sensors", Industrial Computing, Oct. 1996.
"Requirments of Open ,Modular Architecture Controllers" of the wib 1–11.
"Selecting the Right Fieldbus" http://www.gespac.com/html/fieldbus select .html pp. 1–5.
"EIA To Consider Lon Works(r) Standard for Home Networking", http://www.lonworks echelon . com /news/press/092296. 2 pages.
"Echelon Joins Java Alliance to Develop Open API Specifications for Industrial Automation", http://www.lonworks.echelon.com/about/021wfaq2.html#q9 4 pages.
"About LonWorks and Control Technology", http://www.lonworks.echelon.com/about/02ablton .html#peerto 1 page.
"Frequently Asked Questions About Lon Works Networks", http://www.lonworks.echelon.com/about/021wfaq1.html#q1.

*Primary Examiner*—James P. Trammell
*Assistant Examiner*—Kakali Chaki
*Attorney, Agent, or Firm*—Darby & Darby

[57] ABSTRACT

A novel control automation system for enabling I/O boards to access communication networks for receiving and transmitting real time control information over a communication network is disclosed. The system includes a control bus, a node controller and a development system. External hardware that connects to I/O devices such as sensors, motors, monitors, machines, etc. can be connected to the invention via I/O boards that receives and transmit digital signals, representing control information, to the bus. The bus functions as the hub of operation, receiving network communications, processing cooperative logic and transmitting information over the communication network. The bus enables single or multiple controllers to access real time information generated by the attached hardware. The bus also enables the execution of I/O operations that originated in external controllers and transmitted over the communication network. The bus allows any I/O control board having a common interface, such as ISA, PCI, Compact PCI, etc., to connect to the bus by attachment to one of its slots. An intelligent embedded implementation process provides the logic necessary to enable the connectivity between the I/O boards and the communication network. The development system includes a real-time compiler for generating p-code to be executed on the real-time kernel running in the node controller. The real-time compiler generates p-code from the combination of event triggers, event actions and program logic making up the user's application.

14 Claims, 17 Drawing Sheets

OPENBUS SYSTEM FOR CONTROL AUTOMATION NETWORKS

FIELD OF THE INVENTION

The present invention relates generally to computer communication networks and more particularly relates to a system for implementing a control automation network.

BACKGROUND OF THE INVENTION

Openness in the world of automation means being able to buy a variety of products from a variety of vendors and have everything work together seamlessly. To be truly open, however, means the network or platform is accessible to anyone and there is more than one source of enabling technology, i.e., microprocessors and application code. Openness promises significant savings in both time and money. However, recent attempts at openness have not lived up to the promise.

The current market trend is to move to an open, modular architecture controller that will include a horizontal integration of the currently existing fragmented technologies. Currently, most computerized numerical control (CNC), motion and discrete control applications incorporate proprietary control technologies. There are numerous difficulties associated with using proprietary technologies. These include such things as vendor dictated pricing structures, non common interfaces, higher integration costs and the requirement of specific training for troubleshooting and operation. Separate controller elements, a modularity concept and higher level requirements for various elements of an open modular architecture controller are becoming a necessity in a growing number of industries.

The expected benefits of having open and modular architecture controllers include reduced initial investments, low life cycle costs, maximized machine uptime, minimized machine downtime easy maintenance of machines and controllers, easy integration of commercial and user proprietary technologies, plug and play of various hardware and software components, efficient reconfiguration of controllers to support new processes, incorporation of new technologies and the integration of low cost, high speed communication in machining lines for transferring large amounts of data.

The technology that can enable the new trends and requirements supplied by the personal computer (PC) standards connectivity and communications, the 'Plug and Play' standard for PC cards is becoming a way of life. Within the control industry, the PC is becoming increasingly recognized as a viable technology that will enable the required flexibility and performance.

In today's large automation market, there is a growing number of PC board manufacturers that produce a variety of boards. These boards are targeted towards automation implementation that use the PC and the control platform. Since automation data networks implements a proprietary technology that are not very open for 'Intranet communication.'

Traditional Automation and Control Layer networks are typically medium sized and function to connect PLCs or PCs to related devices within cells or throughout the plant. These networks send small to medium sized packets of data repetitively and have millisecond response times.

A high level block diagram illustrating an example prior art proprietary control network including proprietary programmable logic controllers, sensors and I/O devices is shown in FIG. 1. A proprietary network 33 (e.g., Fieldbus) forms the core of the automation control system. Connected to this network are programmable logic controllers (PLCs) 34 which as also proprietary. Connected to the PLCs 34 are the sensors and other I/O devices 32. The proprietary PLCs implement the Automation and Control Layer functionality and the sensors and I/O devices implement the Information and Device Layer.

Traditionally, a single manufacturer was able to provide the necessary connectivity with its own network and PLC products and those of qualified third parties. This is not a trivial task as the lead manufacturer must assist these third parties throughout the development process and even after products start to ship. The lead manufacturer, typically the one making the controllers, assumes network ownership by providing specifications, enablers, e.g., chips and software, and test suites for compliance and interoperability.

Examples of previous attempts at openness in the field of industrial networking include the Fieldbus and manufacturing automation protocol (MAP). Both buses are open networks that are not currently meeting user expectations. The MAP bus is not in widespread use today and most vendors have dropped development of MAP products. One of the problems is that although the products have been designed in accordance to a standard specification, many versions of a specification are in use at any one time. In addition, many so called open products require unique configuration software which is only available from the manufacturer of the product. Thus, it becomes a difficult task to get products from different vendors, all built to different versions of a specification, to interoperate together correctly.

Fieldbuses are a special form of local area networks dedicated to applications in the field of data acquisition and the control of sensors and actuators in machines or on the factory floor. Fieldbuses typically operate on twisted pair cables and their performance are optimized for the exchange of short point to point status and command messages. Numerous other Fieldbuses are in existence such as Filbus, Bitbus, FIP, CAN and Profibus standard networks.

SUMMARY OF THE INVENTION

Accordingly, it is an object of the present invention to provide an automated control system that overcomes the disadvantages and limitations of the prior art.

It is another object of the present invention to provide an automated control system that provides automated control over standard communication networks.

Another object of the present invention is to provide an automated control system that permits the communication of data between various sensors and I/O devices and conventional networks.

Yet another object of the present invention is to provide an automated control system that enables a controller to access real-time information generated by attached hardware regardless of the location of the requesting controller.

Another object of the present invention is to provide an automated control system that enables a controller to execute I/O operations that originated in controllers attached to the network.

The present invention comprises a novel control automation system for enabling I/O boards to access communication networks for receiving and transmitting real time control information over a communication network. The system includes a control bus, a node controller and a development system. External hardware that connects to I/O devices such as sensors, motors, monitors, machines, etc. can be connected to the invention via I/O boards that receives and transmit digital signals, representing control information, to the bus. The bus functions as the hub of operation, receiving network communications, processing cooperative logic and transmitting information over the communication network. The bus enables single or multiple controllers to access real time information generated by the attached hardware. The bus also enables the execution of I/O operations that originated in external controllers and transmitted over the communication network. The bus allows any I/O control board having a common interface, such as ISA, PCI, Compact PCI, etc., to connect to the bus by attachment to one of its slots. An intelligent embedded implementation process provides the logic necessary to enable the connectivity between the I/O boards and the communication network.

The development system includes a real-time compiler for generating p-code to be executed on the target system. The target system, e.g., the node controller, runs the real-time kernel. The target system can be a PC running a commercially available operating system such as Windows NT, VxWorks, Lynx, etc. The real-time compiler generates p-code from the combination of event triggers, event actions and program logic making up the user's application. External input signals and entities such as variables, timers, etc. are analyzed and used to trigger events in the real-time kernel. Based on the program logic as expressed in the p-code, various actions are taken in response to changes in the values of the external input signals and/or entities. The real-time kernel functions to implement a state machine that receives inputs and generates outputs. The actions taken by the system are represented as a sequence of frames with each frame representing a unit of action.

Changes in the value of external input signals and/or entities trigger one or more events. Each event points to an action, i.e., a set of frames. These actions are then analyzed and executed.

There is therefore provided in accordance with the present invention a control automation system for controlling a plurality of input and output (I/O) devices in accordance with a user's application, the system connected to a network for communicating control automation information, the system comprising a development system optionally coupled to the network, the development system generating p-code embodying event triggers, event actions and program logic implementing the user's application, and at least one node controller coupled to the network for executing in real-time the p-code generated by the development system.

The node controller comprises processor means for managing and controlling the operation of the node controller, the processor means for executing a real-time kernel, the kernel implementing the user's application embodied in p-code, network interface means for connecting the node controller to the network, I/O device interface means for connecting the node controller to the plurality of I/O devices, and bus means for interconnecting together the real-time kernel, the network interface means and the I/O interface means.

The development system comprises a real-time compiler for generating p-code in accordance with the event triggers, event actions and program logic of the user's application. The kernel means comprises an external input signal scanner for reading, storing and determining changes to external input signals received from the plurality of I/O devices, an event triggers evaluation module for detecting changes to the external input signals and internal entities, the event triggers evaluation module for determining and resolving all event triggers corresponding to the detected changes, a scheduler for marking all actions corresponding to the event triggers that resolve true, an action execution unit for executing and implementing the actions marked for execution by the scheduler, and an entity processor for determining any changes to values assigned to an entity, the entity processor notifying the event triggers evaluation module of the entity value changes.

In addition, the I/O device interface means comprises a third party I/O interface control board. The bus means comprises a bus contained in but not limited to the group comprising Peripheral Component Interconnect (PCI) bus, VESA Local (VL) bus, V-bus, Industry Standard Architecture (ISA) bus, VersaModule Europa (VME) bus and Extended Industry Standard Architecture (EISA) bus.

There is also provided in accordance with the present invention a node controller apparatus for use in a control automation system, the system for controlling a plurality of input and output (I/O) devices in accordance with a user's application, the system including a network for communicating control automation information, the apparatus comprising processor means for managing and controlling the operation of the node controller, the processor means for executing a real-time kernel, the kernel implementing the user's application embodied in p-code, network interface means for connecting the node controller to the network, I/O interface means for connecting the node controller to the plurality of I/O devices, and bus means for interconnecting together the processor means, the kernel means, the network interface means and the I/O interface means.

The bus means comprises a bus contained in but not limited to the group comprising Peripheral Component Interconnect (PCI) bus, VESA Local (VL) bus, V-bus, Industry Standard Architecture (ISA) bus, VersaModule Europa (VME) bus and Extended Industry Standard Architecture (EISA) bus.

Further, there is provided in accordance with the present invention a kernel for implementation on a computer, the computing means part of a control automation system for controlling a plurality of input and output (I/O) devices in accordance with a user's application, the kernel comprising an external input signal scanner for reading, storing and determining changes to external input signals received from the plurality of I/O devices, an event triggers evaluation module for detecting changes to the external input signals and internal entities, the event triggers evaluation module for determining and resolving all event triggers corresponding to the detected changes, a scheduler for marking all actions corresponding to the event triggers that resolve true, an action execution unit for executing and implementing the actions marked for execution by the scheduler, and an entity processor for determining any changes to values assigned to an entity, the entity processor notifying the event triggers evaluation module of the entity value changes.

The action execution unit performs a method comprising the steps of reading the p-code contents of a frame, analyzing the p-code, reading the values of external input signals and/or internal entities, and performing the command embodied in the p-code, generating any output signals in accordance with the command, and modifying any entity values in accordance with the command.

In addition, there is provided in accordance with the present invention, in a computer system, a method of generating p-code for execution on a node controller as part of a control automation system for controlling a plurality of input and output (I/O) devices in accordance with a user's application, the application including event triggers, event actions and program logic, the method comprising the steps of generating a plurality of pointer tables, each pointer table associated with either an external input signal or an entity, each pointer table comprising a plurality of pointer entries, each pointer entry pointing to an event trigger, generating an event trigger table, the event trigger table comprising a plurality of event trigger entries, each event trigger entry corresponding to an action that references the particular external input signal or entity that points thereto, generating a plurality of actions, each of the actions comprising at least one frame, the actions, the actions representing the generation of output signals and/or the modification of the internal entities, and wherein the plurality of pointer tables, the event trigger table and the plurality of actions generated in accordance with the event triggers, event actions and program logic making up the user's application.

There is also provided in accordance with the present invention a node controller apparatus for use in a control automation system, the system for controlling a plurality of input and output (I/O) devices, the system including a network for communicating control automation information, the apparatus comprising processor means for managing and controlling the operation of the node controller, network interface means for connecting the node controller to the network, I/O interface means for connecting the node controller to the plurality of I/O devices, and bus means for interconnecting together the processor means, the network interface means and the I/O interface means.

Further, there is provided in accordance with the present invention a node controller apparatus for use in a control automation system, the system for controlling a plurality of input and output (I/O) devices in accordance with a user's application, the system including a network for communicating control automation information, the apparatus comprising processor means for managing and controlling the operation of the node controller, the processor means for executing a real-time kernel, the kernel implementing the user's application embodied in p-code, network interface means for connecting the node controller to the network, and bus means for interconnecting together the processor means, the kernel means and the network interface means.

BRIEF DESCRIPTION OF THE DRAWINGS

The invention is herein described, by way of example only, with reference to the accompanying drawings, wherein.

DETAILED DESCRIPTION OF THE INVENTION

The present invention is a system for providing computer operated real-time process control with the means for interacting with an external system. The present invention also provides a development system comprising a computer compiler for generating real-time code executable on a real-time kernel that resides in a target system. In addition, the present invention provides automation control over standard communication networks such as Ethernet and ATM. The system comprises an intelligent network I/O node controller for automation control that has a common interface with external processors and compilers. In addition, the network I/O node controller implements local logic to create an intelligent controller. A key aspect of the present invention is that automation control information can be transmitted on a conventional backbone network using a conventional connectivity protocol without the need for dual networks, i.e., one for standard data and one for automation control information. Further, a control bus in the intelligent network I/O node controller permits the use of off the shelf I/O cards for interfacing the node controller to input and output devices.

As stated previously, since conventional automation networks implement proprietary technologies they are not well suited for open Intranet communications. The OpenBus system of the present invention functions to fill the void to provide the infrastructure or 'infranet' for communications within a control environment. Sensor and actuator level data is managed locally within the infranet but can be shared with higher level data networks through Intranets or other networking platforms. Using open APIs, devices within the infranet share process data and device status information with other nodes via the Intranet or the Internet. The OpenBus system of the present invention enables communication from sensors and actuators on the plant floor to the plant manager's desk anywhere in the world via the Internet, for example, resulting in a seamless network from I/O to the Internet.

OpenBus connectivity can be combined with Java applets in industrial applications making it possible for a plant manager, for example, to monitor, change or control any element of the industrial control system from the sensor all the way to a high level information system. Plant maintenance personnel can access devices at any point in the network, gather data and make modifications. Service technicians can download new software to devices in the field using Java applets received through an Intranet or Internet connection. If technical support is required, a direct line can be established with a customer support representative to diagnose and repair devices remotely.

Utilization of OpenBus

Figure 1:
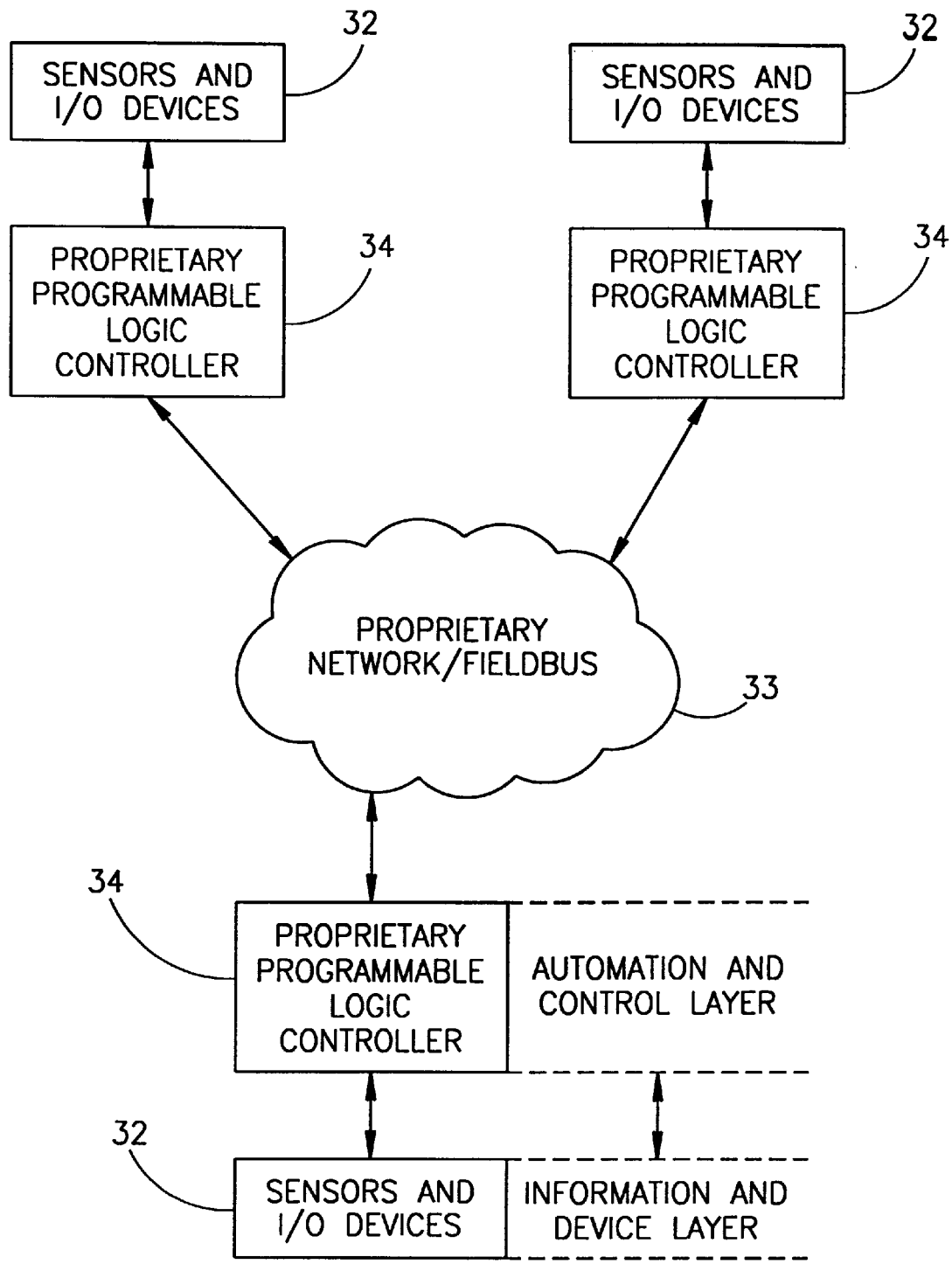
FIG. 1 is a high level block diagram illustrating an example prior art proprietary control network including proprietary programmable logic controllers, sensors and I/O devices.
Figure 2:
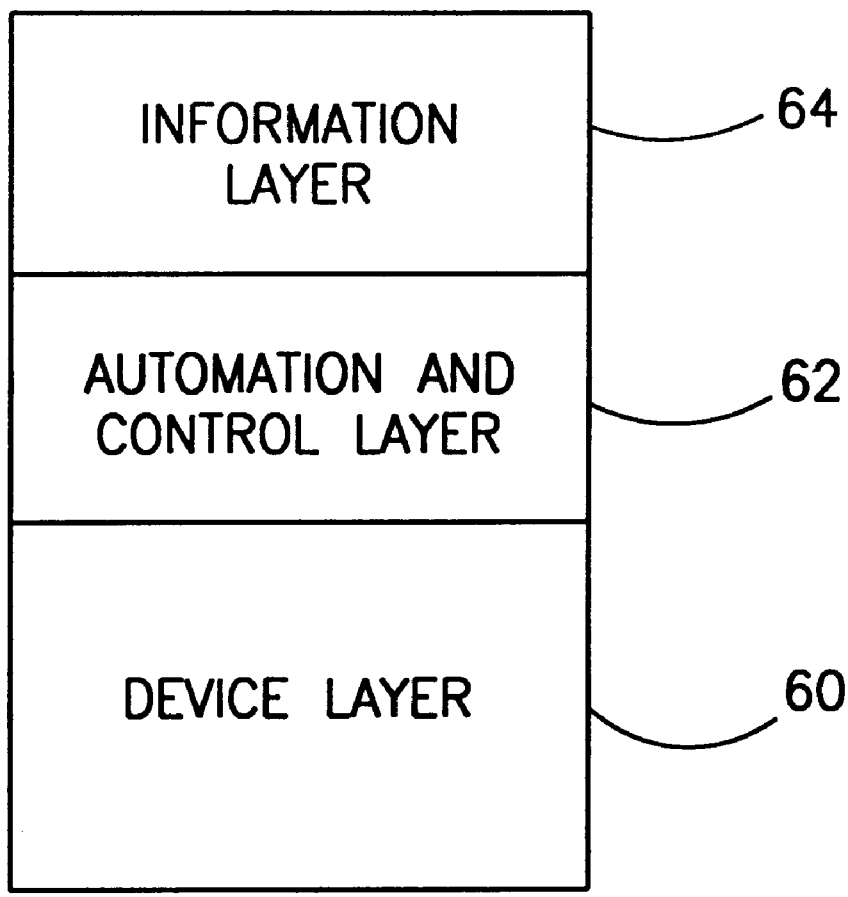
FIG. 2 is illustrates the various layers of the OpenBus control automation network of the present invention.

Today, with the advent of more economical and more powerful microprocessors, the world has flattened and broadened. The factory floor, mirroring the organization in general, has seen the number of levels decrease and the span of control increase. With reference to FIGS. 1 and 2, this flatter, broader view of the world necessities fewer layers, namely: Information Layer 64, Automation and Control Layer 62 and a Device Layer 60 of FIG. 2 rather than the two layers of FIG. 1.

The Information Layer 64 comprises computers and associated software derived from a variety of suppliers on a variety of computing platforms. The Information Layer is the link between the automation and information environments via manufacturing information systems (MIS) and manufacturing execution systems (MES). Users choose the computing platform, software and operating system for their particular application.

Openness is required here because no one vendor offers the entire scope of host computers, software and communication interfaces, such as computer cards, bridges, routers and media. Considering industrial automation, Ethernet, primarily TCP/IP, has become a de facto standard for the Information Layer. Users purchase products from multiple vendors expecting openness. Control vendors therefor support Ethernet in their controllers, supervisory software and drivers.

The Automation and Control Layer 62 comprises DCS controllers, programmable logic controllers (PLCs), I/O chassis, dedicated human interfaces, motor drives and PCs. This layer is the core of the architecture that bridges the Information and Device Layers, enabling communication throughout the enterprise. Responses here must be in the order of milliseconds to be considered real time. For the Automation and Control Layer the driving force is the need for deterministic data delivery between controllers and I/O devices.

These devices, however, are specific in nature and are typically proprietary. Control manufactures have traditionally licensed their architecture to other vendors but only in a guaranteed and controlled manner. Only if a limited number of partners work closely together can performance and interoperability be maintained.

In the Device Layer 60, low end devices that are traditionally hardwired into I/O cards are now networked. Devices are either discrete, e.g., sensors, starters, drives, I/O blocks, etc., or process oriented, e.g., transmitters, transducers, valves, single loop controllers, etc. The wide range of devices requires openness in device layer systems. At this level, no single vendor can possible fill all potential product and application needs. The present invention enables verifiable adherence to an accepted standard in order to ensure product compliance and interoperability.

Devices are less complex at the Device Layer than they are at the Information Layer but they are more diverse. The size and cost to imbed connections in a device are critical at this layer. For example, consider adding a network connection to a $ 70 photoeye. In addition, no single vendor can offer all the possible devices, e.g., sensors and actuators, a user could need. For a true device network, the actual devices must be interoperable from manufacture to manufacturer. An I/O device can be taken from one network and be replaced with an I/O device from another network while the operation of the system behaves the same. The present invention provides this level of interoperability by using standard communication control networks such as Ethernet or FDDI on the one hand and by permitting third party connectivity via standard PC I/O boards using standard PC buses such as PCI, EISA or VME.

OpenBus of the Present Invention

Networks in an automation control system require varying degrees of openness by virtue of the devices they connect and the functions they perform. As previously discussed, difference architecture layers and devices dictate different degrees of openness. Networks must therefore offer a level of openness compatible with the architecture layer and the devices they connect.

Users, however, purchase control products at the device level, e.g., sensors, actuators, pushbuttons, etc., from a number of different manufactures. For this reason, most vendors develop products that adhere to emerging device level networking standards.

The OpenBus system of the present invention of connecting PC bus architectures to area network buses using an embedded application brings the high speed and high throughput capabilities of the area network buses, e.g., Ethernet, FDDI, ATM, etc., as well as the openness of PC buses, e.g., PCI, ISA, EISA, VME, etc., to the large number of third party I/O control board manufacturers. In addition, numerous control functions are implemented locally on the OpenBus using a distributed and cooperative architecture.

Control functions include, but are not limited to, high speed counters, axis control, continuous analog output, fixed analog output, etc. These control functions are implemented via software executing on the OpenBus on board processor thus obviating the conventional method of installing special hardware for each desired function.

Figure 3:
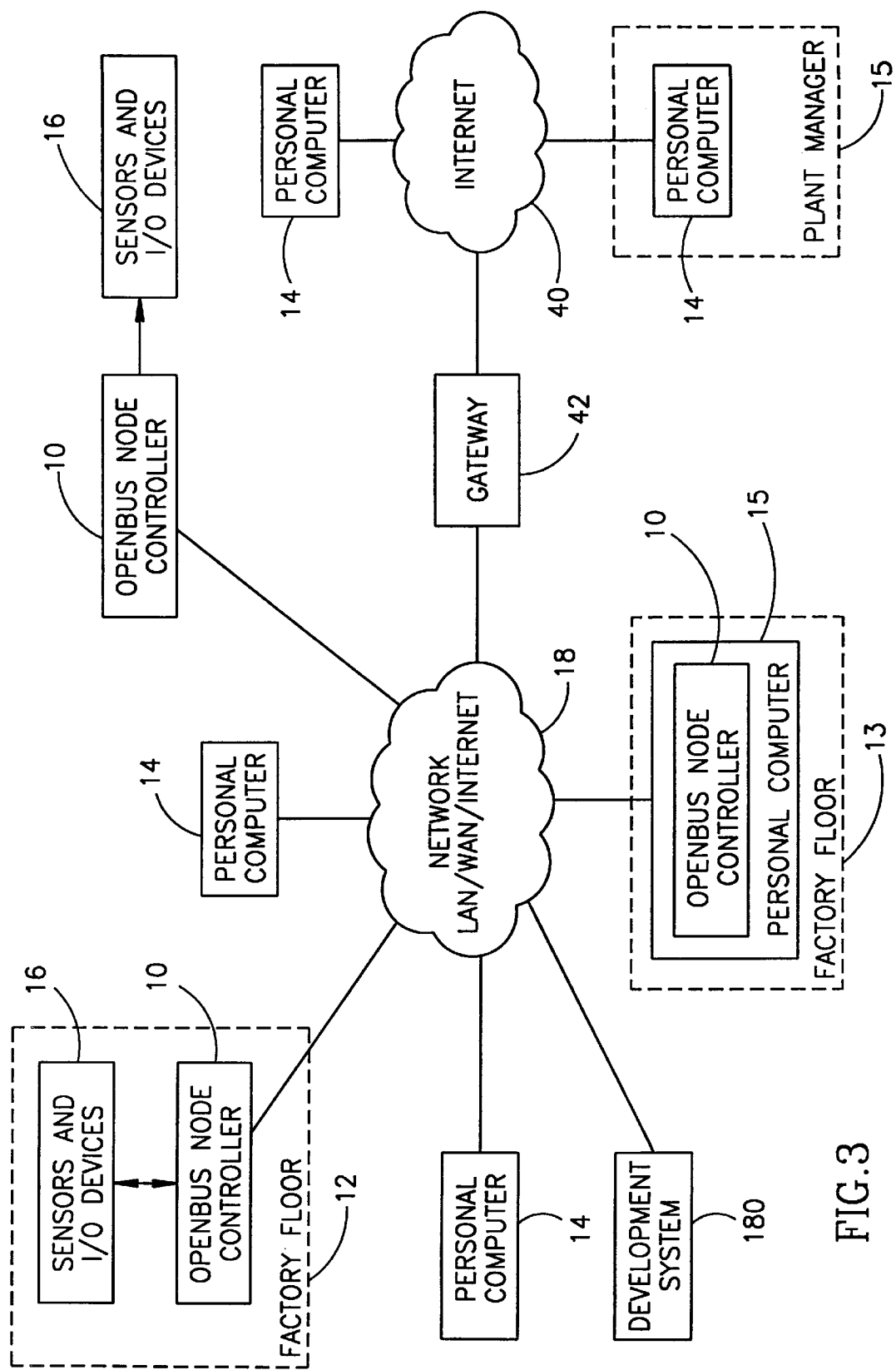
FIG. 3 is a high level block diagram illustrating a control automation network constructed in accordance with an embodiment of the present invention.

A high level block diagram illustrating an automation control network constructed in accordance with an embodiment of the present invention is shown in FIG. 3. At the core of the system, termed OpenBus, is the OpenBus node controller 10. Each OpenBus node controller is connected to the network 18 which may be, for example, a LAN, WAN, the Internet, Intranet or any other suitable data, control or area network. Personal computers 14 are also connected to the network. The PCs function to execute various application programs constituting the Information Layer. In addition, the p-code control application can be executed on PCs as well. A gateway 42 provides connectivity to external networks such as the Internet 40.

Coupled to each OpenBus node 10 are sensors and I/O devices 16. For example, a factory floor 12 may contain one to many hundreds of OpenBus node controllers. Using the system of the present invention, a plant manager 15 located anywhere in the world can monitor and control sensors and I/O devices on the floor of a factory located around the world.

As stated previously, the OpenBus system also comprises a development system 180 that may optionally be coupled to the network 18. The development system can be hosted by a conventional personal computer or equivalent device. The development system enables a user to generate pseudo-code or p-code that can be loaded onto and executed by a real-time kernel that resides in the OpenBus node controller 10. In addition, the p-code can be executed on a standard PC running any commercial operating system. A more detailed description of the development system is presented later in this document.

As stated previously, openness in an industrial control automation network is very desirable. More specifically, within the network, openness is very important at the Control Layer. In the past, this layer was designed by committees which is difficult resulting in a lack of sufficient openness. The system of the present invention functions to open the Device Layer, e.g., sensors, starters, I/O blocks, etc., and to allow third parties to supply I/O control devices that would be able to connect to the network via the OpenBus system using PC boards built according to standards such as PCI, ISA, EISA, VME, etc.

Conventional area networks such as Ethernet, ATM, FDDI, etc., under the present invention, comprise independent intelligent network nodes. Each OpenBus intelligent node comprises an imbedded processor that functions to intermediate between the I/O boards and the area network. A set of high level APIs can be written that allow each processor, controller or computer connected to the area network or the Internet to access sensor information at the application connectivity layer. In addition, the intelligent nodes participate in a distributed processing control environment by implementing independent local functionality that was previously programmed using the development system.

Figure 4:
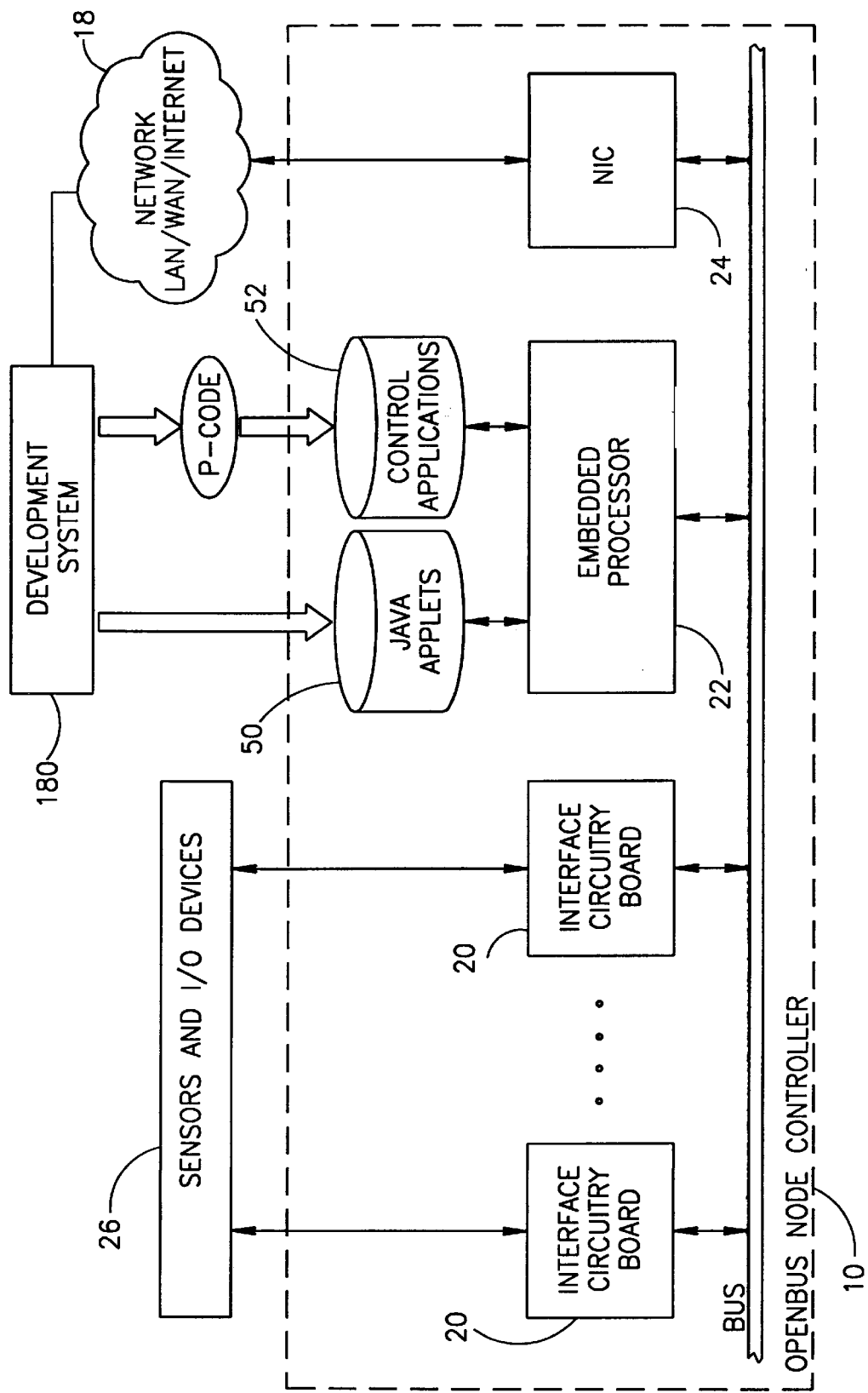
FIG. 4 is a high level block diagram illustrating the open bus node controller of the present invention connected to a network, sensors and I/O devices.

A high level block diagram illustrating the open bus node controller 10 of the present invention connected to a network, sensors and I/O devices is shown in FIG. 4. The node controller 10 comprises one or more interface circuitry boards 20 coupled to a bus. These interface circuitry boards can be any widely available off the shelf third party automation control I/O board designed for either generic or specific applications. The bus can be any commonly used generic conventional bus, such as any of the buses discussed below. A network interface card (NIC) 24 provides the interface circuit boards connectivity to the network 18.

An embedded processor 22 controls and manages the node controller, functioning to control the communication between the interface circuitry boards and the NIC. The embedded processor is capable of executing Java applets 50 and application p-code control applications 52 developed on the development system. The local bus permits certain portions of an application program to be implemented in the node controller as a form of distributed or cooperative automated control processing. Further, the NIC and the I/O boards permit the local attachment of various analog and digital sensors, thus creating an integrated smart sensor attached to the network.

The development system 180 is shown in the Figure to illustrate that the p-code it generates forms the intelligent software control means for the embedded processor 22. The process control algorithms and logic flow input by the user using the development system is represented in the p-code that is executed in the OpenBus node controller.

The OpenBus system of FIGS. 3 and 4 enables I/O boards to access conventional communication networks for the receipt and transmission of real-time control information over the network. Hardware that includes I/O attachment (e.g., sensors, motors, monitors, machines, etc.) are connected to the OpenBus via I/O boards that receive/transmit signals representing control information over the bus.

The OpenBus node controller 10 functions as the hub of operation of the system. It receives network communications, processes cooperative logic and transmits information over the network. The system permits multiple controllers, such as PCs 14 or node controllers 10, to access real time information generated by attached hardware 26 located anywhere in the network. A node controller 10 can execute I/O operations that originated in PCs 14 or other controllers 10 and transmitted over the network 18 and/or the Internet 40 communication networks.

The 'open control' approach implemented in the OpenBus architecture of the present invention provide third party vendors with the required variety and the critical mass of products to satisfy user application needs. An OpenBus control network functions to deliver tested and certified multi-vendor performance from competing third parties, which can only benefit users.

Figure 7:
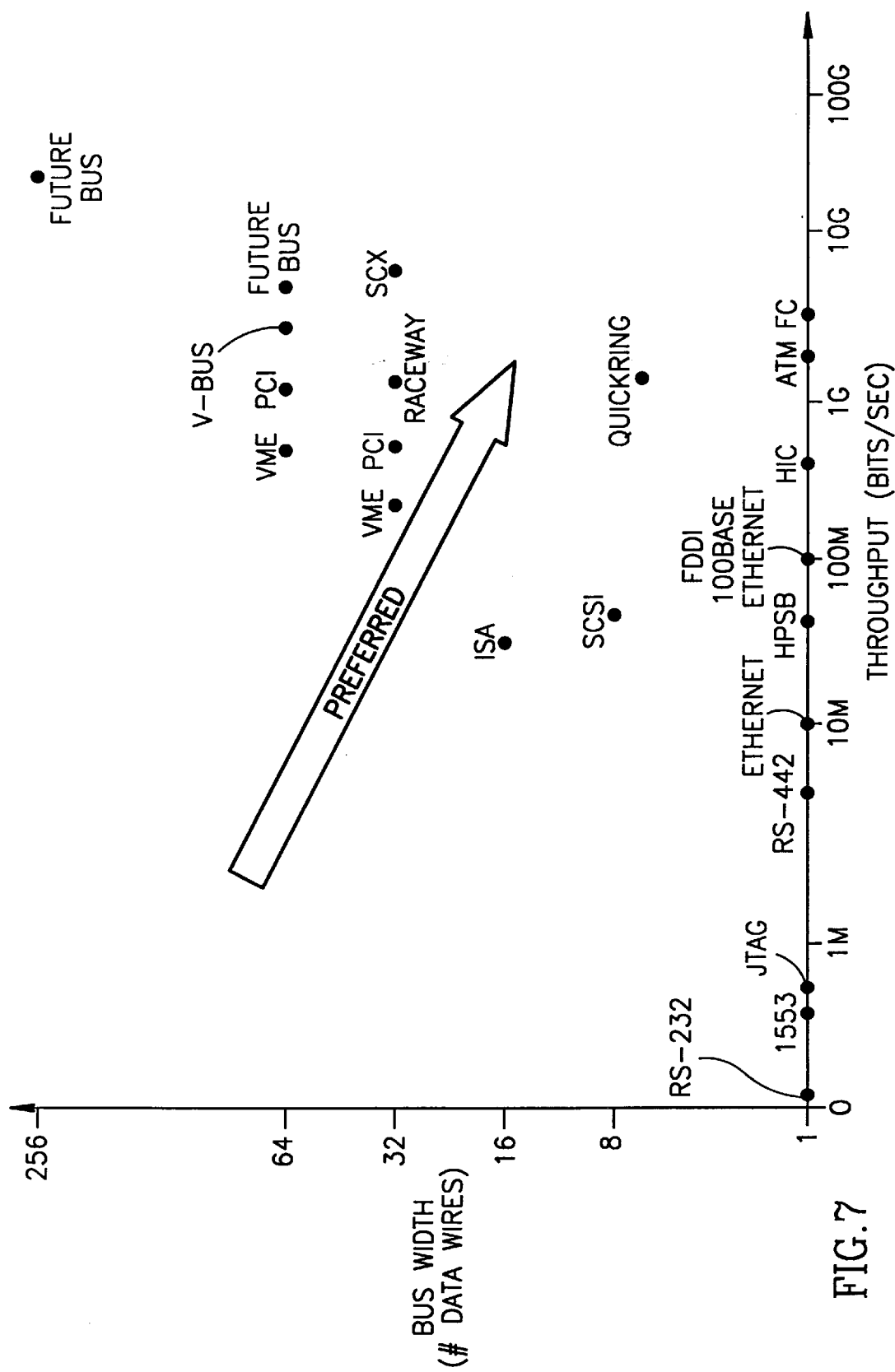
FIG. 7 illustrates the bus width versus throughput for some of the buses in common use today.

The OpenBus of the present invention satisfies the demand today for more open automation systems in both networks and supporting devices. There is a trend towards open protocols, e.g., Ethernet, ATM, etc., at the Information Layer. The present invention provides a system able to offer accepted and supported networks at the Device Layer as well. The Automation and Control Layer will remain controlled-open due to the unique performance requirements. As shown in FIG. 7, the advancement in speed and throughput within the open network architecture is much advanced in comparison with conventional existing proprietary control networks supplied by a relatively few individual vendors. The OpenBus of the present invention enables the delivery of the latest high speed area network capabilities to the automation control field.

A key feature of the OpenBus system is that it is completely open at the Information and the Device Layers and controlled open at the Automation and Control Layer. A key advantage of this feature is that it offers numerous benefits to users. A user can choose the low end devices and host platforms that best meet application requirements. This provides users with an open architecture whereby the devices are the most variable yet maintain stability over the real time control system. The Automation and Control Layer functions to effectively bridge the Information and Device Layers while maintaining time critical communications between controllers and I/O devices.

OpenBus Control Processes

Figure 5:
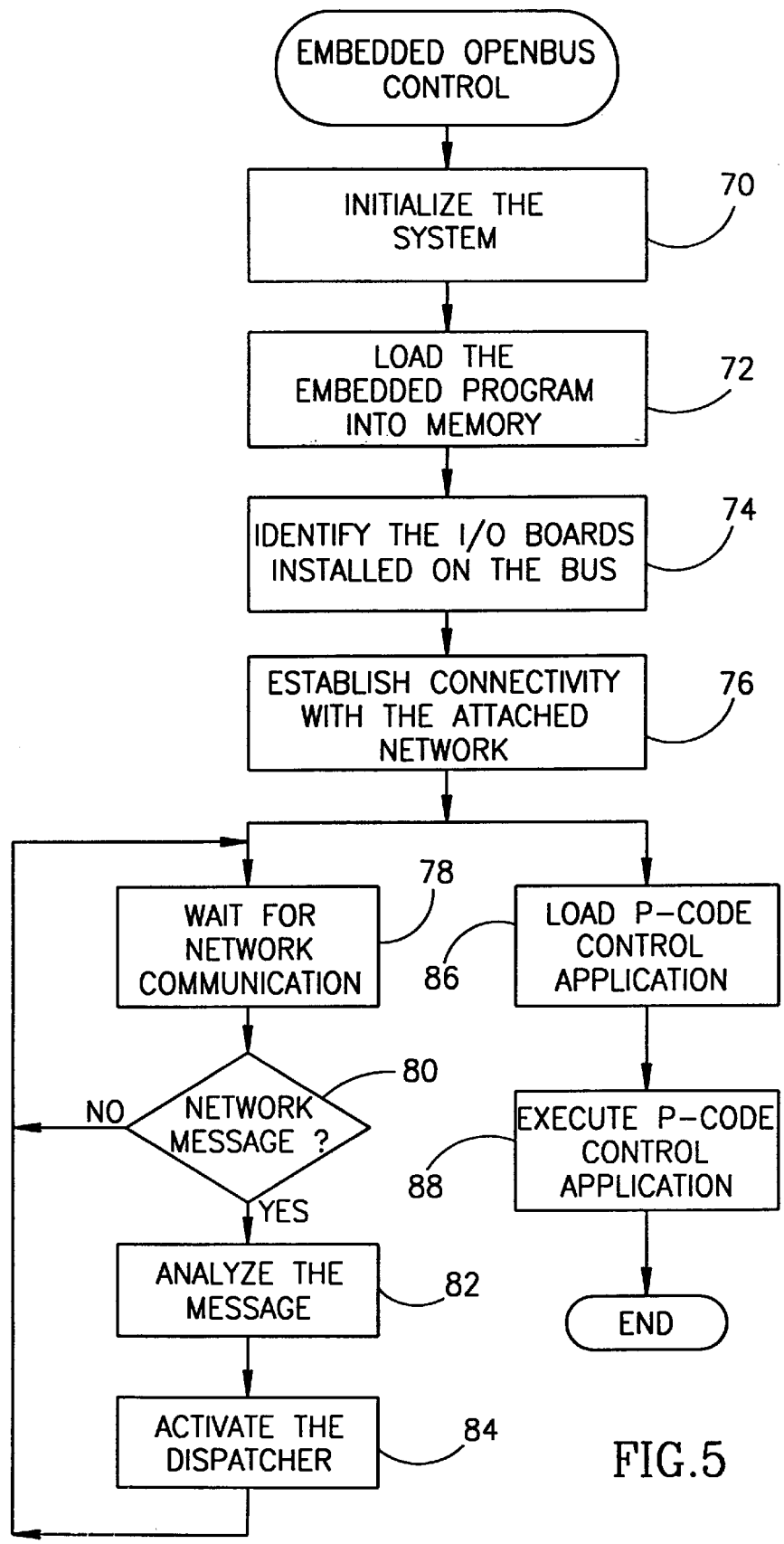
FIG. 5 is a high level logic flow diagram illustrating the embedded open bus control process of the present invention.

A high level logic flow diagram illustrating the embedded open bus control process of the present invention is shown in FIG. 5. With reference to FIGS. 3 and 4, the first action performed by the embedded processor 22 upon power up is to initialize the node controller (step 70). Once initialized, the processor loads the embedded program into memory (step 72). The embedded program comprises control programs developed by the development system written and compiled into p-code. In addition, the development system can generate Java scripts or applets. Then, the processor goes out on the bus and identifies each of the I/O boards 20 installed on the bus (step 74). Once the I/O boards are identified, the processor attempts to establish communications with the attached network 18 via NIC 24 (step 76).

At this point two separate processes are began which execute is parallel with each other. One process manages the communications over the network and the other process executes the real-time p-code control application that was previously developed using the development system.

The first step of the network communication management process is to wait for a network communication (step 78). Once a network communication is received, the processor checks if it is a network message (step 80). If it is not a network message control returns to step 78. If it is a network message, the message is then analyzed (step 82) and the dispatcher is activated (step 84). Note that optionally, the network communication management process can be implemented in Java code. The dispatcher is described in more detail below.

The first step of the control application is to load the p-code from an external storage device (step 86). Once the p-code is loaded, it is executed in order to enable and perform the control application logic (step 88).

Note that the node controller can operate as a hub only, tying the sensors and I/O devices 26 (FIG. 4) to the network 18 via one or more off the shelf interface circuitry boards 20 without the functionality of executing user's application code (i.e., p-code) and/or Java scripts. Likewise, the node controller can operate to only execute user's application code and/or Java scripts without interfacing sensors and I/O devices to the network.

Figure 6:
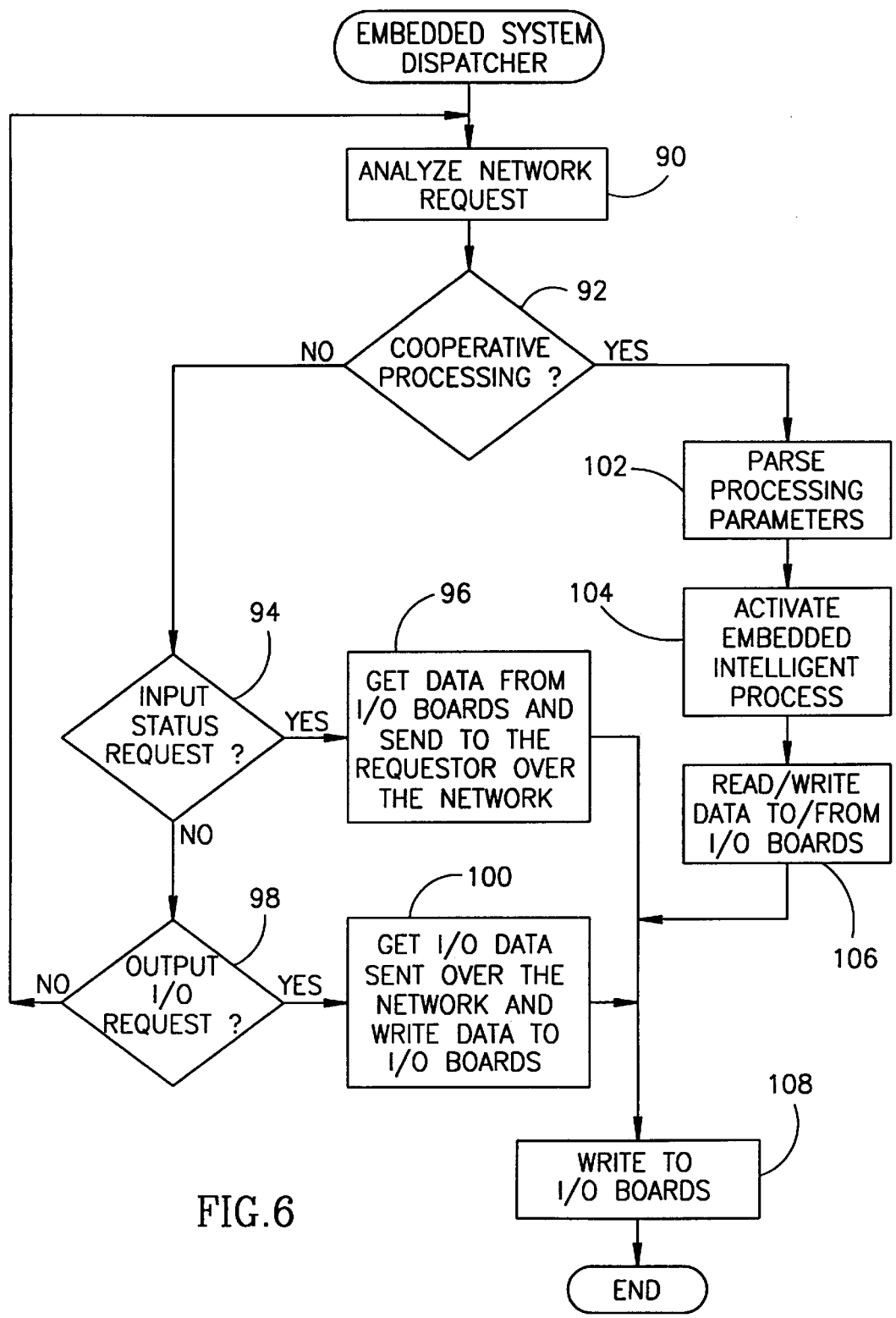
FIG. 6 is a high level logic flow diagram illustrating the embedded system dispatch process of the present invention.

The dispatcher process of the present invention will now be described in more detail. A high level logic flow diagram illustrating the embedded system dispatch process is shown in FIG. 6. The first step performed is to analyze the network request contained in the message (step 90). If the network request is a cooperative processing requires, the processing parameters of the request are parsed (step 102). In accordance with the parameters parsed, an embedded intelligent process is than activated (step 104). This embedded intelligent process then performs reads and/or writes to the I/O boards (steps 106, 108).

If the network request is not a cooperative processing request, it is checked whether the request is an input status request (step 94). If it is, the corresponding data is retrieved from the I/O boards and sent to the requester over the network via the NIC (step 96).

If the request is not an input status request, it is checked whether the request is an output I/O request (step 98). If it is not, control returns to step 90. If it is an output I/O request, the I/O data sent over the network is written to the appropriate I/O board(s) (steps 100, 108).

Conventional Open Buses

The level of openness required for an application varies with and is dependent upon the functionality of the communication layer and the types of devices found at that layer. Openness is usually achieved by the use of standards. These standards are either sanctioned by an official body, e.g., IEC/ISA SP50 Fieldbus, or is commonly accepted enough to become a de facto standard, e.g., Ethernet TCP/IP. Many vendors and end users prefer de facto standards over official standards because they result in a shorter time to market and have a singular customer and application focus.

Communications in a signal processing system is performed by buses of various types: direct point to point, shared multi-drop or network (i.e., being made up of links, buses pr switches), control buses, data buses, test and maintenance buses, area network buses, etc. These buses can be implemented in serial fashion (i.e., one data line or fiber) or parallel fashion (i.e., multiple data lines or fibers). They can be slow (e.g., kilobits per second) or fast (e.g., gigabits per second). They may also have protocols varying from simple clocking to elaborate access, validation and acknowledgment schemes. The interface point of either is a computational element or a bus. Examples of conventional open system bus standards available today are illustrated in FIG. 7 and described in more detail below. The bus width versus throughput for many buses in common use today are presented. The broad downward sloping arrow indicates the preferred path of bus development, i.e., to faster and narrower buses. These buses can be used to perform different functions, such as system control, data transfer, test and maintenance, input/output (I/O) and area networking. The area networking buses, e.g., Ethernet, 100Base Ethernet, FDDI and ATM, are non proprietary in nature and have an order of magnitude higher throughput when compared with the Fieldbus technology which exists today within automation control bus technology.

Some examples of conventional open system bus standards in common use today will now be described in further detail.

Control Buses

Control buses are typically used to allow multiple processors to interoperate in a system through the exchange of commands and some data. In small systems, where data traffic is minimal, this single type of bus may be the only bus employed. Some currently available control buses are described briefly below.

Filbus

The Filbus is based on distributed intelligence and peer to peer communication. Firmware functions are built into each Filbus I/O module and enable basic capabilities such as pulse count, delay before action and sending/receiving messages to/from other modules on the network. The Filbus runs at 375 Kbps, permits a maximum of 250 nodes, uses master/slave arbitration, uses twisted pair cable and has application in data acquisition.

Bitbus

The Bitbus was originally introduced by Intel Corporation as a way to add remote I/O capability to Multibus systems. This original Fieldbus is one of the most mature and most broadly used networks today. Bitbus permits programs to be downloaded and executed in a remote node providing for distributed system configuration. The Bitbus runs at 375 Kbps, permits a maximum of 250 nodes, uses master/slave arbitration, uses twisted pair cable and has application in process control.

Worldfip

The Worldfip provides a deterministic scheme for communicating process variables. Worldfip uses an original mechanism whereby the bus arbitrator broadcasts a variable identifier to all nodes on the network, triggering the node producing that variable to place its value into the network. This feature eliminates the notion of node address and makes it possible to design distributed process control systems. The Worldfip runs at 1 Mbps, permits a maximum of 250 nodes, uses a bus arbiter for arbitration, uses twisted pair cable and has application in real time control.

Profibus

The Profibus is a Fieldbus network designed for deterministic communication between computers and PLCs. It is based on a real time capable asynchronous token bus principle. Profibus defines multi-master and master slave communication relations, with cyclic or a cyclic access, permitting transfer rates of up to 500 Kbps. The physical layer 1 (2-wire RS-485), the data link layer 2 and the application layer are standardized. Profibus distinguishes between confirmed and unconfirmed services, allowing process communication, broadcast and multitasking. The Profibus runs at 500 Kbps, permits a maximum of 127 nodes, uses token passing for bus arbitration, uses twisted pair cable and has application in inter-PLC communication.

CAN

The controller area network (CAN) is a serial bus that is designed to provide an efficient, reliable and very economical link between sensors and actuators. CAN uses a twisted pair cable to communicate at speed of up to 1 Mbps with up to 40 devices. It was originally developed to simplify the wiring in automobiles but its use has spread to machines and factory automation products because of its useful features. Some of its features include the ability of any node to access the bus when the bus is quiet, non destructive bit wise arbitration to allow 100% use of bus bandwidth without loss of data, multimaster, peer to peer and multicast reception, automatic error detection, signaling and retries and data packets of 8 bit length. CAN is the basis of several sensor buses such as DeviceNET from Allen Bradley, CAN Application Layer from CAN in Automation or Honeywell's SDS. The CAN runs at 1 Mbps, uses CSMA for bus arbitration, uses twisted pair cable and has application in sensors and actuators.

Futurebus+

The Futurebus+ operates at speeds of 3.2 GBps using 256 parallel lines or 100 MBps using 32 parallel lines. It was designed primarily as a cache-coherent shared memory bus and also supports large block transfers and message passing. Its intended application was as a migration path for the VMEbus. Besides the increased throughput, Futurebus+ features centralized or distributed mastership arbitration, compelled or packet transfer mode, priority or fairness resource sharing, cache coherence for shared memory multiprocessing, module live insertion and a Control and Status Register standard software interface.

PI-bus

The Parallel Intermodule (PI) bus uses the same basic structure as VMEbus but is adapted for real time, fault tolerant applications such as military mission critical systems. PI-bus is a synchronous, loosely coupled, message passing bus. A node may be master and slave capable or only slave capable. PI-bus uses the same backplane transceiver logic (BTL) interface as Futurebus+. PI-bus emphasizes fault tolerance and is inherently supportive of module level fault containment since it is a loosely coupled bus. It also contains features such as hardware supported intermodule communication containment boundaries, an error management protocol that supports determination of contaminated memory, the ability for software to control access to its memory and explicit software control of intermodule communication. PI-bus has no centralized control, the protocol uses a distributed vie for gaining bus mastership. The PI-bus is a 50 MBps bus using 32 parallel lines. Designers of PI-bus intended the bus operation to be a send and forget interface making it inappropriate as a real time interface in a tightly coupled architecture.

VME

The VersaModule Europa (VME) bus is one of the most successful high end commercial buses in use and has become a de facto standard in high performance industrial automation. The VMEbus is a shared multidrop bus with each node on the bus plugging into the rack backplane such that its address and data lines connect onto the Data Transfer Bus in parallel with those of all other nodes. Tri-state logic is used such that only one node at a time actively drives the bus, with all other nodes passively monitoring its activity. The VMEbus operates at speeds of 40 MBps using 32 parallel lines. Its intended application is as a commercial backplane control bus for high performance systems.

VME64

The VME64 bus operates at speeds of 80 MBps using 64 parallel lines. Its intended application is as an upgrade for the VME bus.

Data Buses

Data buses are typically used to augment a control bus with a higher throughput path for transfer of data between processors. To achieve high speed a data bus is usually implemented as a network of point to point unidirectional links. This avoids the various transmission line problems associated with a shared multidrop bus. Some data buses currently available are described briefly below.

SCI

The Scaleable Coherent Interface (SCI) bus specification define a network in which nodes are interconnected with a set of unidirectional point to point links. SCI provides scaleable network bandwidth because data transfers between nodes may occur concurrently rather than sequentially via a shared bus. SCI operates at speeds of 1 GBps using 16 parallel lines and 250 MBps using a serial line. The basic SCI network is a unidirectional ring where each node receives data from its predecessor node and sends data to its successor node. A mesh network is implemented by equipping each node with two SCI ring interfaces: one in the horizontal direction and one in the vertical direction. A crossbar switch network can be implemented where each node interfaces to the switch via a minimal two node ringlet. SCI uses cache coherent protocols to guarantee consistent data even when data is locally cached and modified by multiple processors. SCI uses a distributed directory based protocol where each line of memory is associated with a list of processor sharing that line. Each memory line maintains a pointer to the processor at the head of the list. Use of the SCI bus is intended with heterogeneous parallel processors.

SCX

SCX is an offshoot of SCI that is being developed for use with heterogeneous high performance parallel processors. The SCX bus operates at speeds of 1 GBps using 32 parallel lines. SCX also requires two counter rotating rings with a bypass switch at each node, similar to FDDI, for fault tolerance whereby neighbor nodes can bypass a failed link, reforming the two rings into a single double length ring.

QuickRing

QuickRing is an offshoot of SCI developed for low cost applications such as PCs, workstations and parallel processors. The QuickRing bus is a SCI like bus that operates at speeds of 200 MBps using 6 parallel lines. QuickRing uses a voucher/ticket protocol, which is from the SCI, to reserve space in the target node queue before transmitting a packet.

HIC

The Heterogeneous InterConnect (HIC) bus defines a low cost, scaleable, serial interconnect for parallel system construction. An HIC link is a bi-directional connection between two nodes, composed of a pair of unidirectional connections. The HIC bus operates at speeds of 10 Mbps to 1 Gbps using copper wire, differential twisted pair, fiberoptic and coax cable. Multiple HIC links per node can be used to build a variety of network architectures, including both hierarchical networks and flat or mesh networks. HIC supports self routed systems using wormhole routing where the packet is read on the fly and the packet is forwarded without being stored in the intervening node.

RACEway

The RACEway bus is a proprietary bus uses the VME 'P2' connector to access a crossbar switch to provide high speed concurrent data paths between boards in a VME chassis. It operates at speeds of 1280 Mbps using 32 parallel lines. The basic element of the RACEway is the RACE crossbar chip which has six I/O channels. A single crossbar chip can interconnect six nodes and provide up to three concurrent 1280 Mbps communication paths between node pairs. Topologies that can be created include fat-tree, switch ring and mesh. The RACEway is a preemtable circuit switched network. The RACEway uses a compelled protocol in that the receiving node can enforce flow control through the use of the 8-wire control and clocking signals. Data flow is bi-directional but can only go in one direction or the other at a time.

Test and Maintenance Buses

Test and maintenance buses are typically used to provide a minimally intrusive path to every hardware module in the system to isolate and debug failures and to possibly reconfigure data flows and computational elements to avoid failed elements. It is usually implemented as a serial, low speed interconnection. This bus can be included as a single bus for non critical systems or as a double redundant bus for mission critical systems. Proper use of a test and maintenance bus often requires the cooperation of the data and control buses, necessitating some type of controller element. A brief description of a few test and maintenance buses currently available is presented below.

Serial Bus/FireWire

The High Performance Serial Bus (HPSB) is similar in function to TM-bus. The HPSB operates at speeds of 6 MBps over a backplane or 40 MBps using two differential signal pairs. Its intended application is as a general purpose interface that can replace a variety of I/O types such as RS-232, RS-422 and SCSI. FireWire, one implementation of HPSB, can carry both synchronous data and isochronous multimedia communications.

TM bus

The Test and Maintenance bus is a linear, synchronous, multi-drop communication bus which transfers data between a master node and one or more slave nodes residing on a single backplane. It is used to communicate diagnostic control and status information between nodes. The TM-bus protocol supports up to 251 separate addresses plus the broadcast and multicast addresses. The TM-bus operates at speeds of 0.8 MBps using a serial line. Its intended application is for use with PI bus in military applications.

MTM

The Module Test and Maintenance (MTM) bus is a parallel multi-drop bus containing five signal lines: Clock, Control, master Data, Slave Data and Pause Request. The MTM bus is intended to provide connectivity between modules within a box, e.g., interconnect JTAG modules. The bus operates at speeds of 1.2 MBps using a serial line.

JTAG

The JTAG bus is a widely used bus for on-module testing. JTAG is a serial bus containing four signal lines: Test Clock, Test Mode Select, Test Data Input and Test Data Output. JTAG defines a Test access Port (TAP) and boundary scan architecture for digital integrated circuitry. The JTAG bus provides a solution to the problem of testing assembled printed circuit boards containing highly complex digital integrated circuits and high density surface mounting assembly techniques. It also provides a means of accessing and controlling design-for-test features built into the digital integrated circuits themselves. JTAG is used internally in most new large IC designs to confirm that each internal component performs its required function, that the components are interconnected in the correct manner, that the components interact correctly and that the IC performs its intended function. The JTAG bus operating at speeds of 3 MBps using a serial line.

Input/Output Buses

Input/Output buses are typically used to collect raw data from sensors and distribute processed data to embedded computer displays. These buses are optimized to transfer large blocks or continuous streams of data with minimal concern for error checking and flow control. Some Input/Output buses currently available are described briefly below.

Fibre Channel

The Fibre Channel (FC) bus is a universal interface for data channels that is optimized for the predictable transfer of large blocks of data such as those used in file transfers, disk and tape storage systems, communications and imaging devices. Fibre Channel provides bi-directional point-to-point connections and support for connected and connectionless operations. Fibre Channel transfers asynchronous information in variable length frames, consisting of a 24 byte header followed by up to a 2048 byte payload of data. Fibre Channel can be implemented in a ring network, but is intended primarily for a switched network. One node may be connected to another node but is typically connected to a fabric node. The fabric node is an entry into a switch that provides transparent connection to other system nodes. Fibre Channel can operate on coax, twisted copper pair and both single and multimode fiber. It operates at speeds of 100 MBps over a serial line.

SCSI

The Small Computer System Interface (SCSI) bus is widely used in workstations to connect the processor to various peripheral devices such as a disk controller. SCSI device are daisy chained together and obtain access to the bus via distributed arbitration. Standard SCSI used an 8 bit bus and a 4 MHz clock to achieve a 4 MBps data transfer rate. Fast SCSI increases throughput to 10 MBps and Fast Wide SCSI uses 16 bits to achieve 20 MBps. SCSI-2 achieves 40 MBps using 32 bits.

1553B

The Mil-Std-1553B Digital Time Division Command/Response Multiplex Data Bus has a long-standing history in military avionics applications where independent boxes need to be interconnected. It operates at speeds of 0.1 MBps and uses a single coax with transfer coupling to reduce the chance of damage when connecting separate boxes. It is usually implemented in a dual or triple standby mode to prevent the bus from becoming a single point of failure in a mission critical application. The 1553 bus uses a 1 MHz clock and Manchester biphase encoding to convert each 16 bit work into a 20 bit serial stream.

RS-232

The EIA RS-232 bus is a widely used bus providing for a point-to-point interface between a single driver and a single receiver at speeds up to 20 Kbps over distance up to 50 feet. An improved version, RS-423, increases the speed to 100 Kbps, increases the number of receivers to ten and reduces the voltage swing to ±4 volts. Its intended application is to interconnect terminal and modem equipment.

RS 422

The RS-422 is the Electronic Industries Association (EIA) EIA-485 bus which operates at speeds of 1 MBps using a serial line. It is similar to RS-423 but uses differential driver signals to increase the transmission speed to 10 Mbps. RS-485 is similar to RS-422 but uses tristate drivers to allow multiple drivers form a shared multi-drop bus.

Area Network Buses

Area network buses are typically used to interconnect processing systems located in separate physical boxes. These buses have been optimized in the past for bursty traffic, but in the future will handle isochronous traffic for multimedia application as well. Some Area network buses currently available are described briefly below.

ATM

The Asynchronous Transfer Mode (ATM) bus was originally conceived as the switching technology for the telephone industry to handle multimedia data. ATM is a logical layer protocol based on bandwidth partitioning for the transmission of large amounts of data, e.g., real-time audio, computer data, images and video, on shared media, point-to-point, switched networks. ATM transfers digital information in consecutive cells (packets) of constant length consisting of a 5 byte header following by a 48 byte payload of data. The header defines a virtual path and a virtual channel as well as other network management functions. The ATM protocols allow a node to establish static or dynamic connections with many other nodes. Although ATM is optimized for virtual connection oriented services, it can be used for connectionless services as well. ATM can be mapped on top of various existing physical layers such as SONET, Fibre Channel or FDDI. ATM operates at speeds of 155 Mbps to 2.5 Gbps over a serial line. Its intended application is for use in telecommunications and as a LAN for workstations.

FDDI

The Fiber Distributed Data Interface (FDDI) bus is a standard for a local area network with a transmission rate of 100 Mbps using a fiber optic cable as the transmission medium. FDDI implements a dual counter rotating ring topology and uses a token access method for packet transmission. FDDI is sometimes used as a higher speed backbone to interconnect several lower speed Ethernet networks. FDDI consists of three layers: Physical Layer, Medium Dependent (PMD), Physical Layer Protocol (PHY) and Media Access Control (MAC). The PMD layer specifies the digital baseboard point-to-point communication between two nodes in the FDDI ring. A ring consists of a set of nodes and unidirectional transmission medium segments connected in a serial closed loop configuration. The dual ring option consists of two identical ring configurations, where the secondary ring transmits in the reverse direction of the primary ring. The PHY Layer specifies the remaining aspects of the physical layer protocols. These protocols include decoding incoming data, encoding outgoing data and clock synchronization. The MAC Layer specifies fair and deterministic access to the medium, address recognition and generation and verification of frames. Access to the ring is controlled by passing a token around the ring. If a node wants to transmit, it strips the token from the ring, transmits frames and then reinserts the token.

Ethernet

Ethernet has become the de facto LAN standard for PCs, workstations and their peripherals. Ethernet uses Carrier Sense Multiple Access with Collision Detection (CSMA/CD) protocol that allows nodes connected in parallel to transmit data without the normal bus mastership arbitration. A node that wants to transmit data first listens to see if any other node is currently transmitting data on the cable, if not, it proceeds to transmit. The node then listens to see if its intended transmission is garbled on the cable and if so aborts transmission and waits a small time before trying again. This protocol is popular because it is cheap and easy to manage. The Ethernet bus is limited, however, to a bandwidth of 10 Mbps using a serial line.

100Base Ethernet

The 100Base Ethernet bus is a higher speed version of Ethernet which retains the original Ethernet protocol for backward compatibility with existing Ethernet. 100Base Ethernet operates at speeds of 100 Mbps using a serial line. Its intended application is as a migration path for 10 Mbps Ethernet.

Myrinet

The Myrinet bus is a low cost, high speed hierarchical switched network that uses a point-to-point bi-directional link, with a clock rate of 40 MHz and a bandwidth of eight lines to achieve a 40 MBps throughput in each direction. Links can connect to nodes or multiport switches, allowing the formation of various network topologies. Data is transmitted in variable length packets, with cut through routing and reverse flow control.

PC Buses

PC buses is a category of buses that is of high commercial significance. PC buses are typically used to interconnect peripherals to a desktop or laptop computer. These buses are optimized for the low cost PC environment and perform several functions such as control, data and input/output. They are important because of their high commercial usage. Some PC buses currently available are described briefly below.

PCI

The Peripheral Component Interconnect (PCI) is an Intel proprietary standard bus designed to handle faster peripherals such as high resolution video boards, disk controllers and LAN devices. PCI defines a low latency path between the microprocessor local bus and other system components. It uses a 33 MHz, 32 bit data path to achieve a data throughput speed of 800 Mbps in burst transfer mode. PCI also defines multiple bus master arbitration and configuration space for automatic software setup. The PCI specification also covers the software architecture needed to guarantee plug-and-play compatibility of modules within a system The intent is to allow a system to automatically configure itself when a new module is plugged into the PCI backplane connector.

VL Bus

The VESA's Local (VL) Bus is a Video Electronics Standards Association (VESA) standard operating at speeds of 100 MBps using 32 parallel lines. Its intended application is as a migration path for the EISA bus.

V-Bus

The V-Bus is intended for high performance symmetric multiprocessing systems. V-Bus is a 64 bit bus that operates at up to 66 MHz to provide a sustained peak rate of 4 Gbps. The bus is controlled by central arbiter, with a parking mode to increase throughput on a lightly loaded bus.

ISA

The Industry Standard Architecture (ISA) bus enjoys huge sales volume due to its use in the PC since the introduction of the 80286 processor chip. The ISA local bus uses an 8 MHz, 16 bit data path to achieve a data throughput speed of 64 Mbps. In newer PC that are based on fast chips such as the Pentium, the ISA is still used for slow peripherals such as fax modems.

EISA

The Extended ISA (EISA) bus operates at speeds of 16 MBps using 32 parallel lines. Its intended application is as a migration path for ISA to interconnect 80386 peripherals.

The OpenBus system of the present invention enables a cost effective solution that provides openness and interoperability. Users can choose the network or the bus based on which offers the greatest connectivity for the devices they value the most.

Modular Implementation

Figure 8:
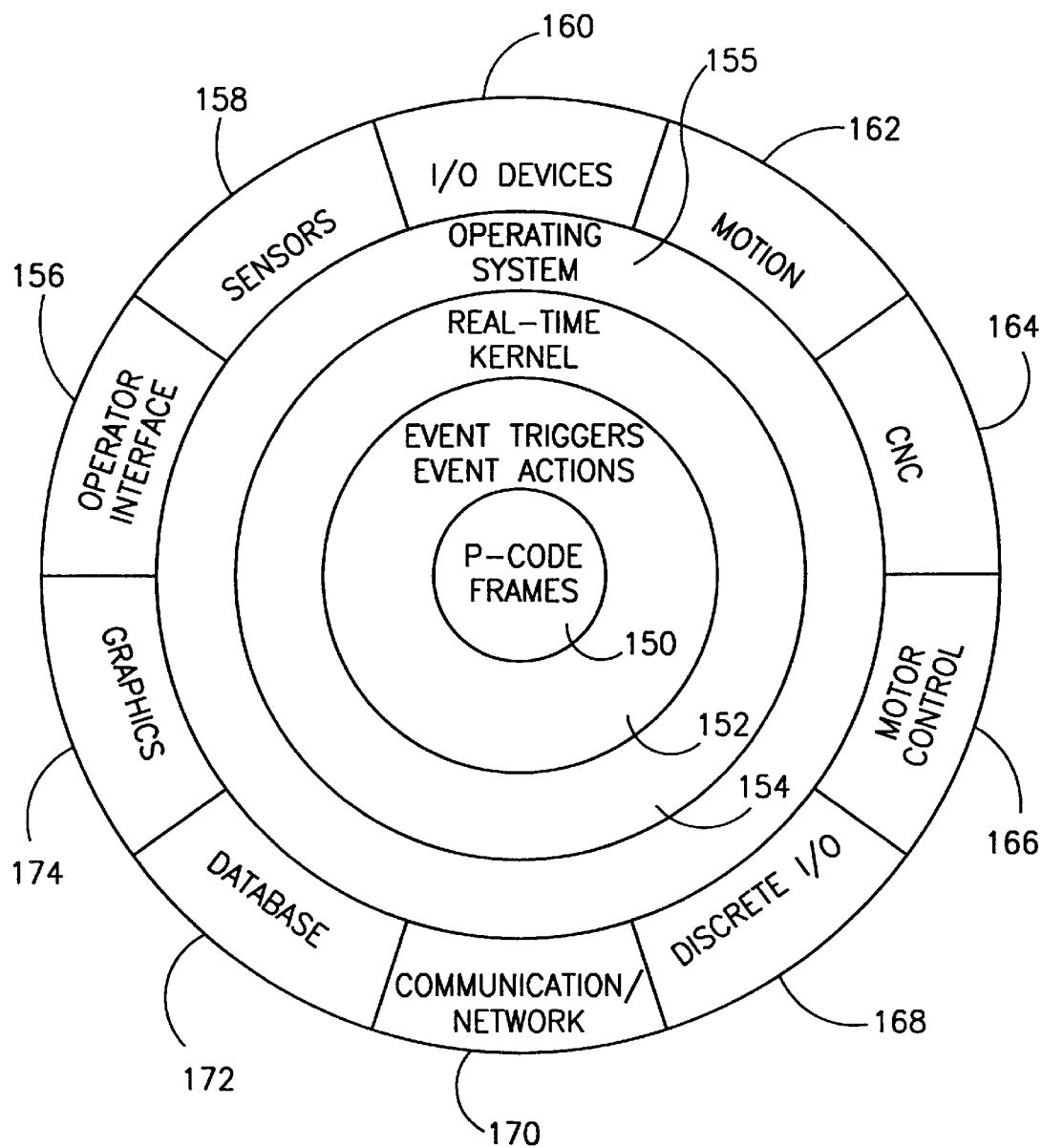
FIG. 8 illustrates the modular portions of the software making up the OpenBus automation system of the present invention.

As stated previously, the present invention is a system for providing computer operated real-time process control with the means for interacting with an external system while also providing a development system comprising a computer compiler for generating real-time code executable on a real-time kernel that resides in the target system. As stated previously, the target system can be a standard PC. An illustration of the modular portions of the software making up the OpenBus automation system of the present invention is shown in FIG. 8. The real-time kernel 154 is the heart of the OpenBus system in that the control algorithms and logic flow that the user desires to implement is executed by the real-time kernel in the target system. At the core of the real-time kernel are p-code frames 150. A p-code frame or simply frame represents a unit of action or operation in the system. For example, frames specify operations to be performed on internal entities such as variables or timers, for example.

Surrounding the p-code frames are event triggers and event actions 152. Complex control operations as specified by the user are broken down by the development system into one or more frames to be executed by the real-time kernel. One or more frames combine to constitute event triggers and event actions.

Surrounding the real-time kernel 154 is the operating system (OS) 155. The real-time kernel comprises the necessary operating system interface to allow it to execute on any desired operating system. The layer surrounding the OS includes various functional modules that perform various roles in the OpenBus system. These functional elements comprise a module for interfacing to sensors 158, I/O devices 160, motion related devices 162, computerized numerical control (CNC) devices 164, devices requiring motor control 166 and discrete I/O 168. In addition, functionality is provided to communicate with one or more networks 170. Further, a database module 172 provides the connectivity to a database that is used by the real-time kernel and application programs. A graphic module 74 provides graphics and drawing related functionality and an operator interface 156 provides the user interface for used by an operator of the system.

Development System and Target System

Figure 9:
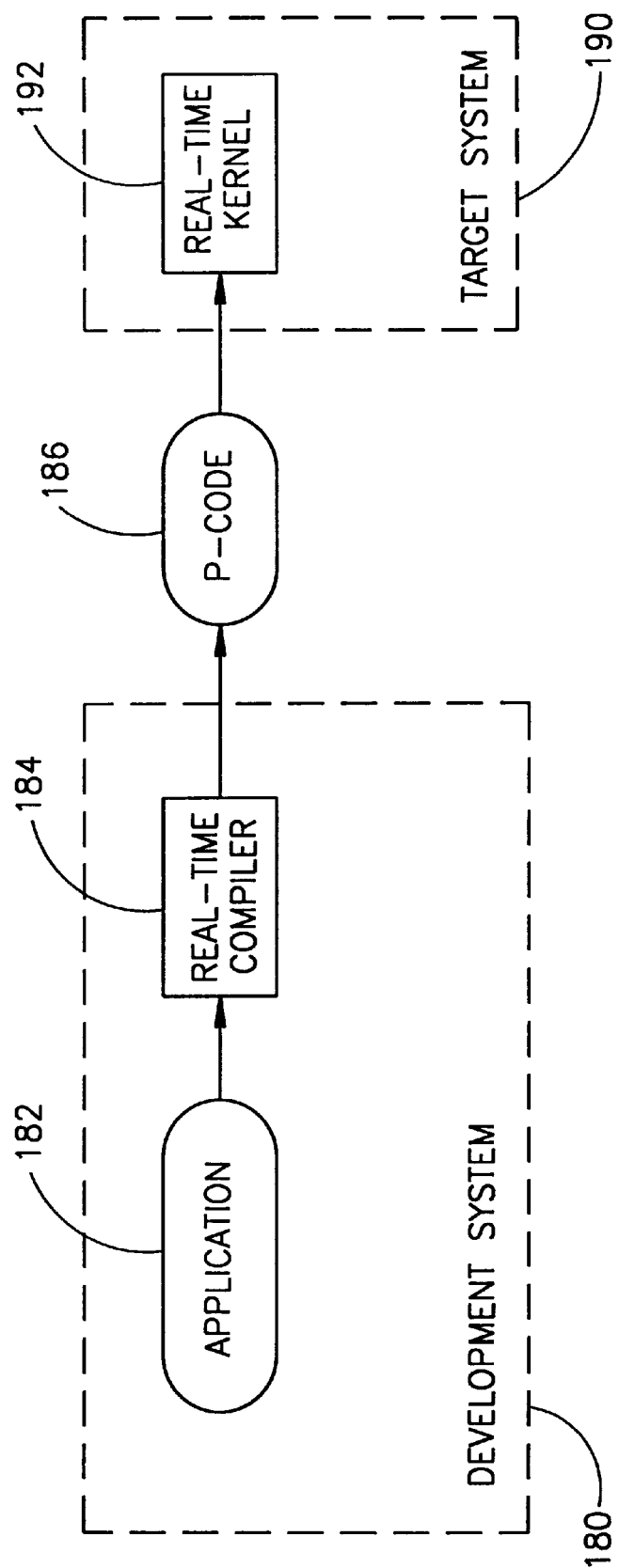
FIG. 9 is a high level block diagram illustrating the development system environment of the present invention.

A high level block diagram illustrating the development system environment of the present invention is shown in FIG. 9. At the core of the development system 180 is a real-time compiler 184. The real-time compiler functions to take as input an application 182 as input by a user and generate p-code 186 that is executable on the real-time kernel 192 in the target system 190.

The real-time kernel in the target system (embodied in the embedded processor 22 in FIG. 4) dynamically changes in response to the structures and parameters defined by the user and represented in her/his application program 182.

Figure 10:
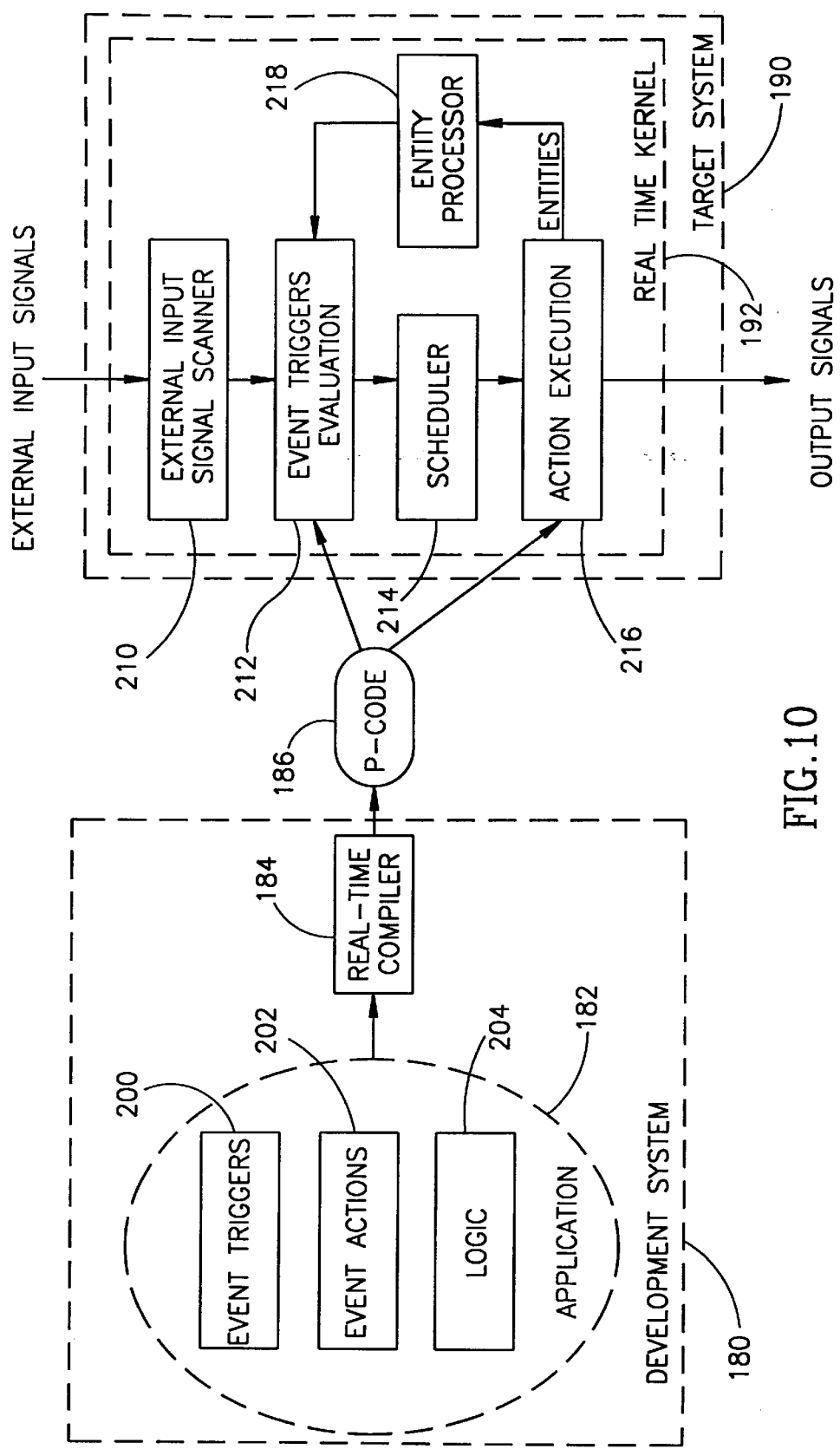
FIG. 10 is a high level block diagram illustrating, in more detail, the development system environment and the target system of the present invention.

With reference to FIG. 10 the development system environment of the present invention will now be described in more detail. As stated previously, the development system 180 comprises an application 182 provided by the user and a real-time compiler 184. The application comprises one or more event triggers 200, one or more event actions 202 and logic 204. These various elements combine to define the user's control program application.

The target system 190 comprises the real-time kernel 192 which functions to execute the p-code generated by the compiler. The real-time kernel 192 comprises an external input signal scanner 210, an event triggers evaluation module 212, a scheduler 214, an action execution unit 216 and an entity processor 218. The external input signal scanner receives external input signals from sensors and I/O devices. The action execution unit generates the signals that are output to the external world.

The event triggers 200, event actions 202 and logic 204 provide the logic and the mechanism required to characterize the behavior of any real-time process the user desires to implement. The behavior of any real-time system which interfaces with external signals and real world processes can be defined using a process state change methodology. In this methodology, when a process transitions to a new state, an action comprising a particular logic and operation sequence is performed. In more complex control processes which include multiple simultaneous activities, the action which must be performed is based upon a combination of processes rather than simply one.

The real-time kernel schedules the execution of event actions in accordance with the process state changes as reflected by the change entity value changes. Entities include but are not limited to variables, timers, counters and external input signals. These various entities are part of the program control logic making up the user's application. Any change to the value of an entity or any external signal triggers an immediate evaluation of the event trigger that incorporates that particular entity.

The programming logic functions as the basis for the event actions. The programming logic comprises pure logic, calculations, mathematical formulas, interfacing with sensors, discrete I/O, motion control, database operation, communication i.e., over networks and operator interface graphics.

All of the external information and programming logic defined by the user and embodied in her/his application comprises various elements such as event triggers, event actions, program variables, timers, counters, program logic, sensor information, motion trajectory planning, motion control, etc. All these elements are broken down, defined and represented via the frame p-code generated by the real-time compiler.

The p-code making up a frame is the smallest building block that enables the real-time compiler to generate code that executes with a response time required of a real-time system. The p-code making up frames comprises a precompiled, one step direct pointer to any piece of information or element which is required in order to perform the logic or operation of the frame. The logic or operation is performed on entities which include variables, timers, I/O port information, I/O values, etc. The precompiled direct pointer to the memory location of the particular entity permits rapid access to the values and references of the entities associated with a frame. These memory pointer references can be performed extremely rapidly with minimal delay thus providing the real-time response needed by the application control program. This is in direct contrast to conventional compiled programming systems that typically involve run time memory address calculations, hash table calculations, heap and stack addressing, etc. in order to resolve memory references thus creating a huge overhead not present in the real-time kernel of the present invention.

Real-Time Kernel

Figure 11:
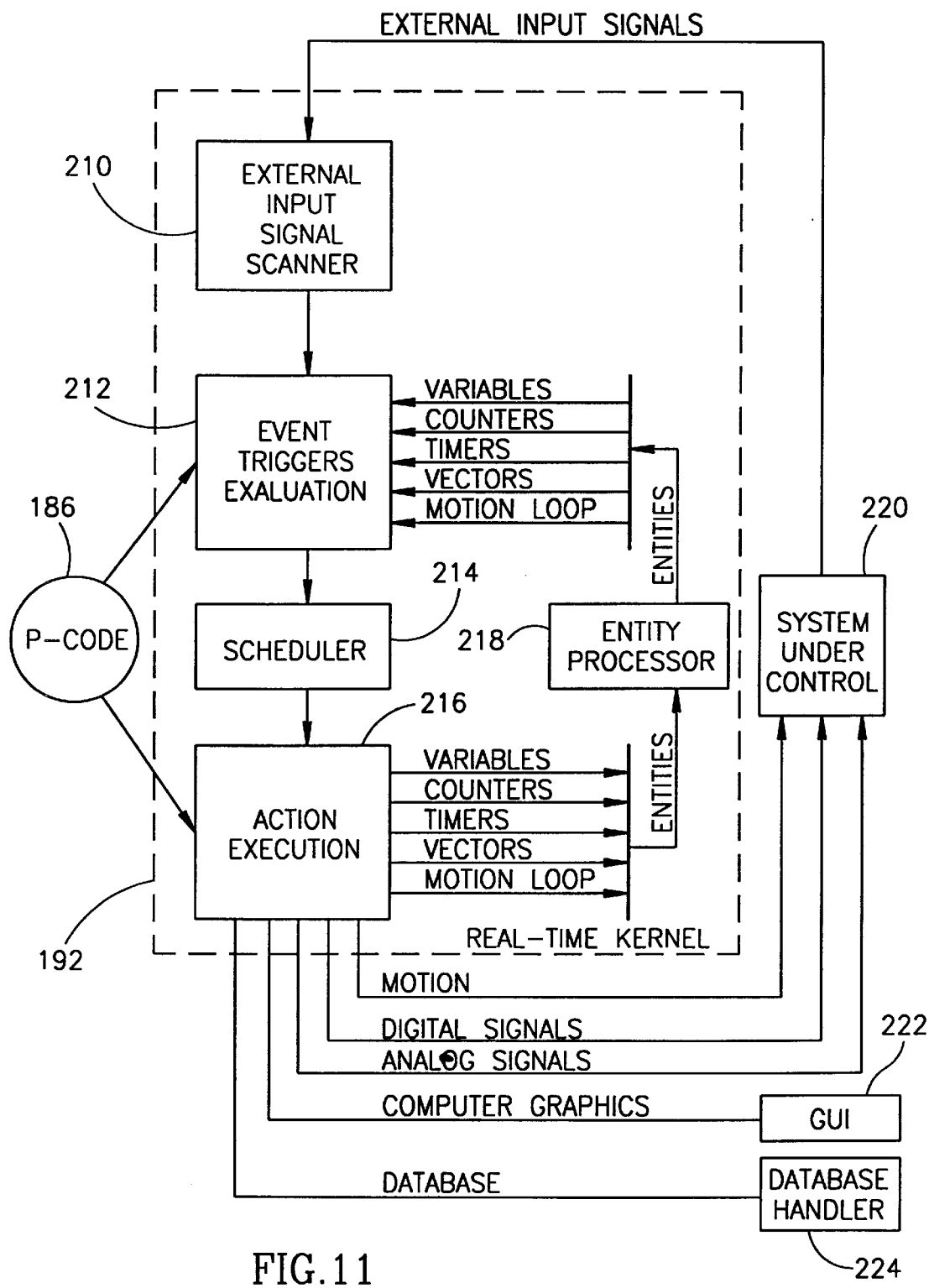
FIG. 11 is a high level block diagram illustrating the real time kernel of the target system in more detail.

The real-time kernel will now be described in more detail. A high level block diagram illustrating the real time kernel of the target system in more detail is shown in FIG. 11. The real-time kernel 192 comprises an external input signal scanner 210, event trigger evaluation module 212, scheduler 214, action execution unit 216 and an entity processor 218. The system under control 220 received outputs from the action execution unit and generates the external input signals input to the external input signal scanner. The p-code 186 generated by the real-time compiler is utilized by the event trigger evaluation module and the action execution unit.

The event trigger evaluation unit 212 receives external input signals from the system under control 220 via external input signal scanner 210 and various entities, e.g., variables, counters, timers, motion vectors, motion loop data, etc., from the entity processor 218. The event trigger evaluation module determines the next state of the system based on the current state and the values of all input entities. The event trigger evaluation module, in combination with the rest of the real-time kernel, serve to implement a state machine. The evaluation module functions to test conditions using a set of rules derived from the user's application.

During a change of state one or more action frames are generated. These action frames are passed to the scheduler 214. The scheduler determines the order of execution for each action frame and passes frames ready for execution to the action execution unit 216.

The action execution unit processes each frame and implements the action contained therein. Depending on the type of action, one or more entities may be modified. The entity processor performs the modification on the entities in accordance with the output of the action execution unit. The action execution unit also generates various output signals such as, but not limited to, motion control signals, digital signals and analog signals. These output signals effect various components of the system under control and serve to modify the state of the system.

In addition, the execution unit outputs data for controlling the computer graphics used in the operator interface. The commands and data are output to the GUI 222 that makes up part of the operating system host the real-time kernel operates in, when the target system is a standard PC.

Further, the execution unit also outputs command and data for controlling a database that are directed to the database handler 224. The database is used to store various data about the system such as attributes, states, entity related data, etc.

Figure 12:
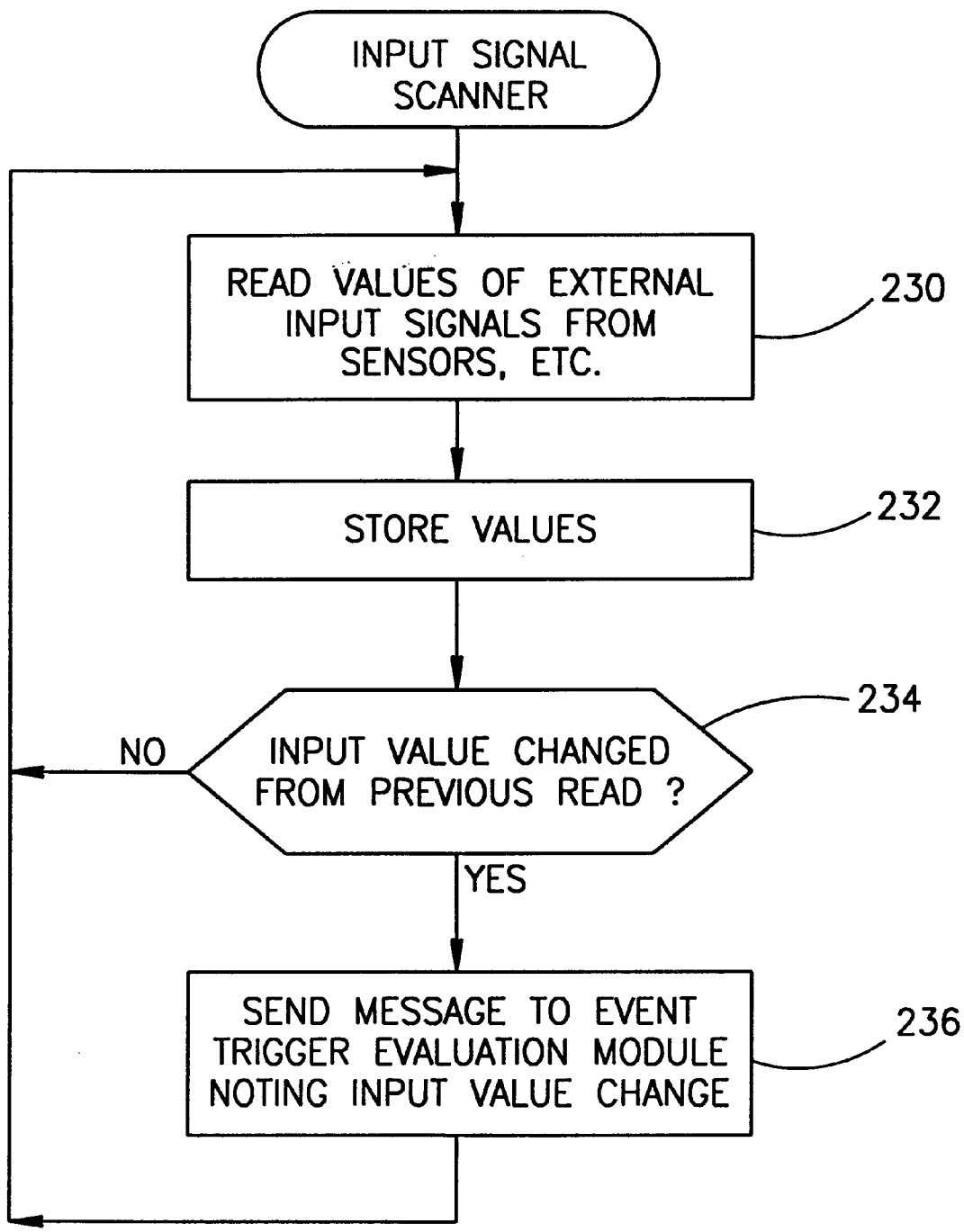
FIG. 12 is a high level flow diagram illustrating the input signal scanner portion of the real time kernel of the target system.

The input signal scanner method performed by the external input signal scanner of the real-time kernel will now be described in more detail. A high level flow diagram illustrating the input signal scanner portion of the real time kernel is shown in FIG. 12. The first step of the method is to read the values of the external input signals from the various sensors, I/O devices that are monitored by the system (step 230). The values read in are then stored for future reference (step 232). All the input values and then scanned or examined and all values that have changed since the previous read are flagged (step 234). In any input signals have changed value, a message is generated and sent to the event trigger evaluation module identifying the input signal and its new value (step 236). This method is repeated over and over in an endless loop. Thus, as the values of the signals input to the system change, these changes are immediately detected and reported to the event trigger evaluation module.

Figure 13:
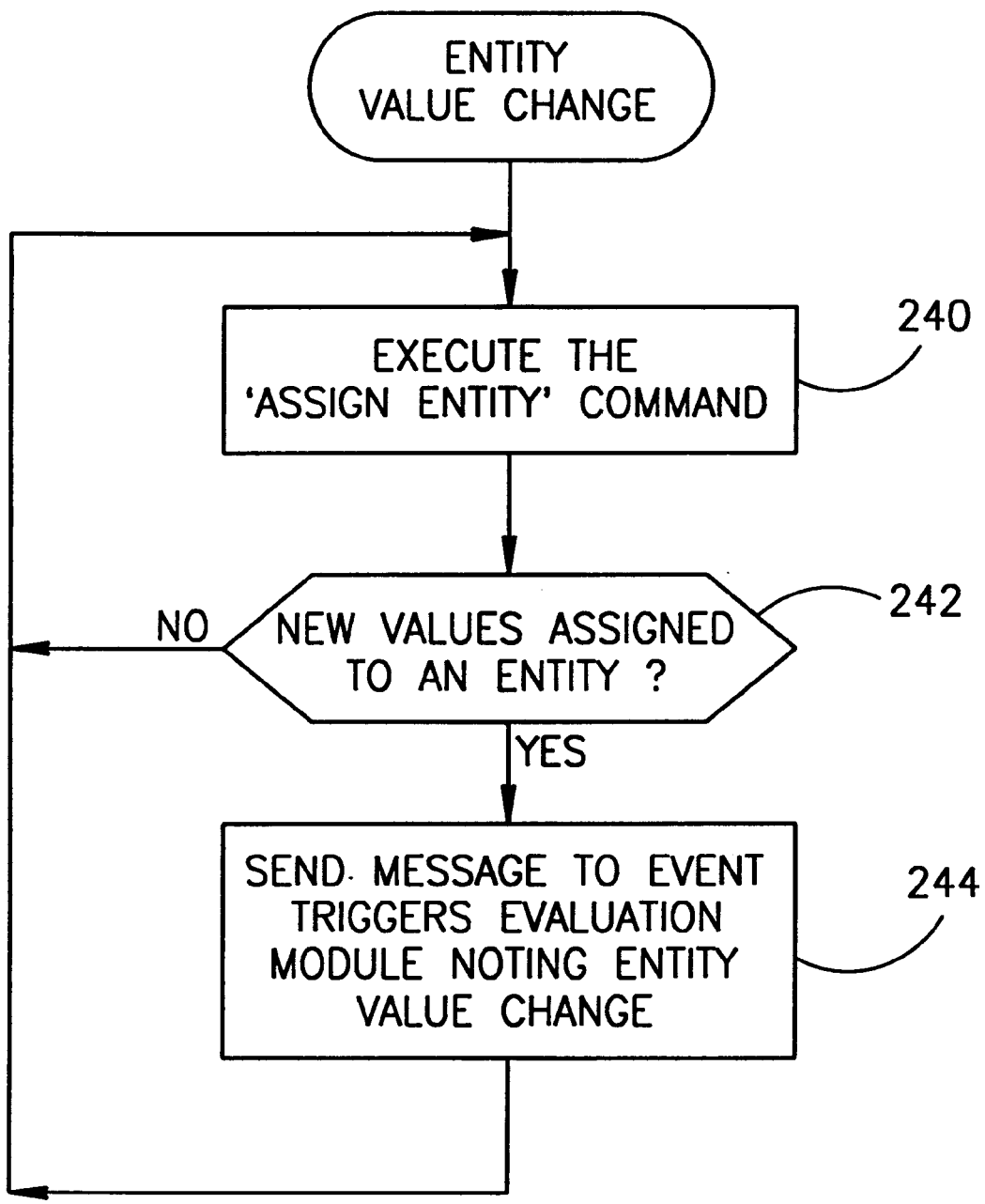
FIG. 13 is a high level flow diagram illustrating the entity value change processing portion of the real time kernel of the target system.

The entity value change method will now be described in more detail. A high level flow diagram illustrating the entity value change processing portion of the real time kernel of the target system is shown in FIG. 13. The step of interpreting and executing the 'assign entity' commands contained in frames is performed by the action execution unit (step 240). The entity processor receives the values to be assigned to the entities and determines whether any new values have been assigned to an entity (step 242). If there are new values to be assigned to an entity, the event trigger evaluation module is notified accordingly with the entity and it new value (step 244).

Figure 14:
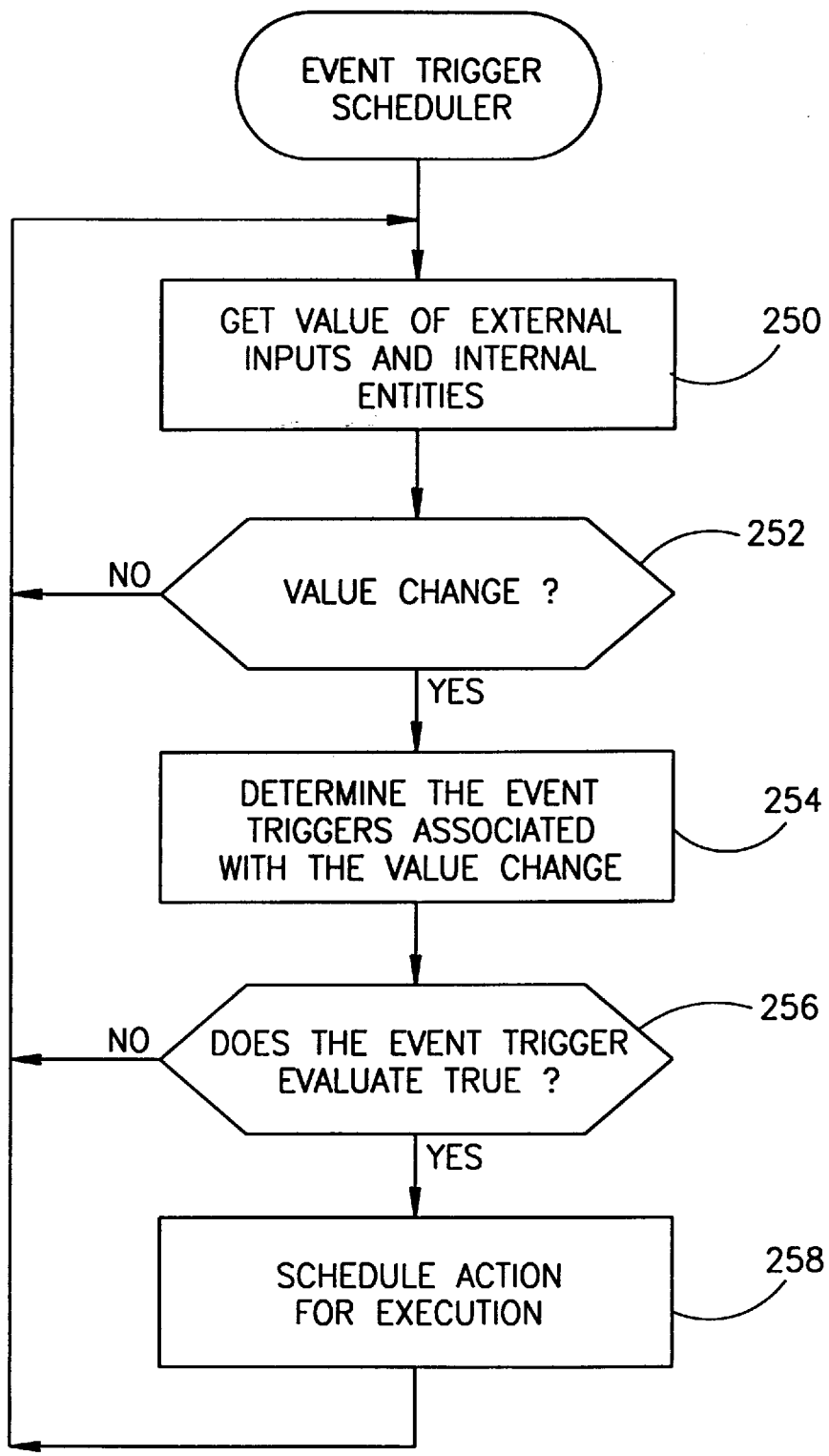
FIG. 14 is a high level flow diagram illustrating the event trigger scheduler portion of the real time kernel of the target system.

The event trigger scheduler method performed by the event trigger evaluation module and the scheduler unit of the real-time kernel will now be described in more detail. A high level flow diagram illustrating the event trigger scheduler is shown in FIG. 14. The first step of the method is to get the values of all external input signals and internal entities in the system (step 250). It is then determined whether any values have changed since the previous reading (step 252). For any values that have changed, the event triggers associated with the value change is determined (step 254). This process is described in more detail later.

Once the event triggers are determined, each trigger is resolved to either true or false (step 256). If an event trigger resolves true, its associated action, as represented by its frame, is scheduled by the scheduler for execution by the action execution unit (step 258).

Figure 15:
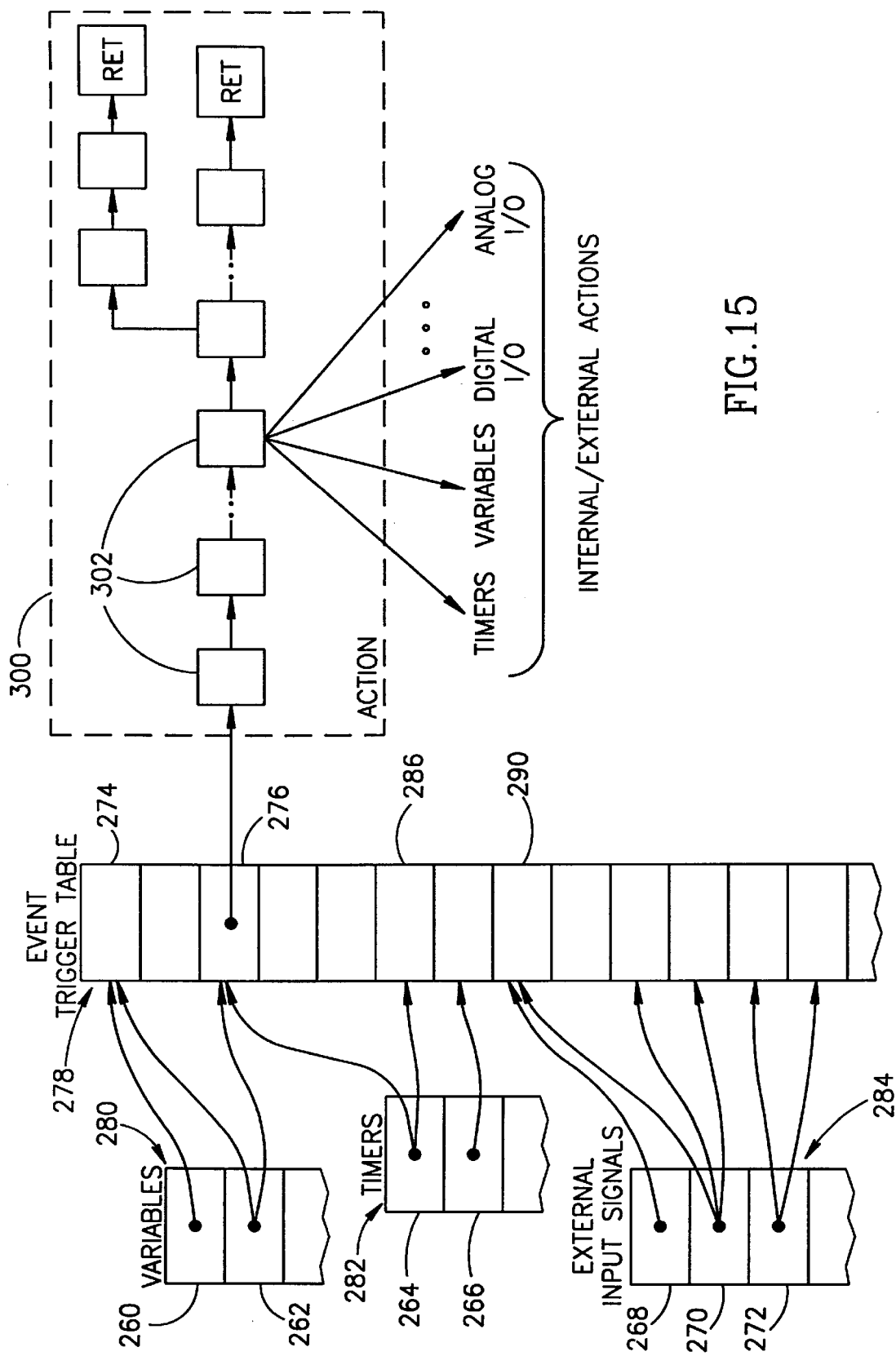
FIG. 15 is a high level block diagram illustrating the internal memory representation of the pointer tables used to implement event triggers and internal/external actions.

The event trigger handling of the real-time kernel will now be described in more detail. A high level block diagram illustrating the internal memory representation of the pointer tables used to implement event triggers and internal/external actions is shown in FIG. 15. Illustrated in the left portion of the Figure are examples of various the internal pointer representations for internal entities such as variables 280 and timers 282 and for external input signals 284. Every entity and external input signal in the system is represented by a pointer in memory. The pointers are grouped into tables according to entity type. For example, the pointers 260, 262 associated with two variables are shown grouped in the variables pointer table 280. The pointers 264, 266 associated with two timers are shown grouped in the timers pointer table 282. Similarly, three pointers 268, 270, 272 are shown grouped in the external input signal table 284. The pointer tables for variables, timers and external input signals are shown for illustration purposes only. The pointers maintained for a system depends on the input signals and various entities that the application uses.

All the entities and external input signals that make up an action frame have their corresponding pointers point to the event trigger pointer for that particular action frame. Every entity and input signal pointer points to a particular event trigger entry in the event trigger table 278. Each entity or input signal may point to multiple event trigger entries and multiple entity and input signal pointers may point to the same event trigger entry. For example, variable pointers 260, 262 both point to event trigger entry 274. Variable pointer 262 points to event trigger entries 274, 276. Timer pointer 264 points to event triggers 276, 286. External input signal pointer 268 points to event trigger entry 290.

It is important to note that all the entity and external input signal pointers used by the system are determined and resolved during compile and load time rather than during run time. In addition, the configuration or input and output devices is known a priori at compile time. Thus, entity or input signal addresses do not need to be computed during execution of the application as is the case in conventional systems. This is performed by conventional system using hash tables, pointer lists, variable lists, etc. The present invention requires only a pointer for each entity or input signal directly to point to all the event trigger entries associated with that entity or input signal. This helps enable the control system automation system of the present invention to operate quick enough to execute the application in real-time.

Each entry in the event trigger table points, in turn, to an action. As stated previously, an action is comprised of one or more frames. For example, the event trigger entry 276 is shown to point to the action 300. In the example illustrated in FIG. 15, the action frame 300 comprises a plurality of frames 302. Each frame can be one of three different types. The three types of frames include: a program logic frame, an operation frame or a condition frame. A program logic frame includes such program logic as jumps, both conditional and unconditional, etc. Operation frames perform an action such as A=B * D, or assign a value to an entity or output signal. For example, a frame may assign a value to a timer, a variable or a digital or analog I/O port. A condition frame tests the given entities to be true or false, e.g., IF A=B+C THEN set an output signal.

Figure 16:
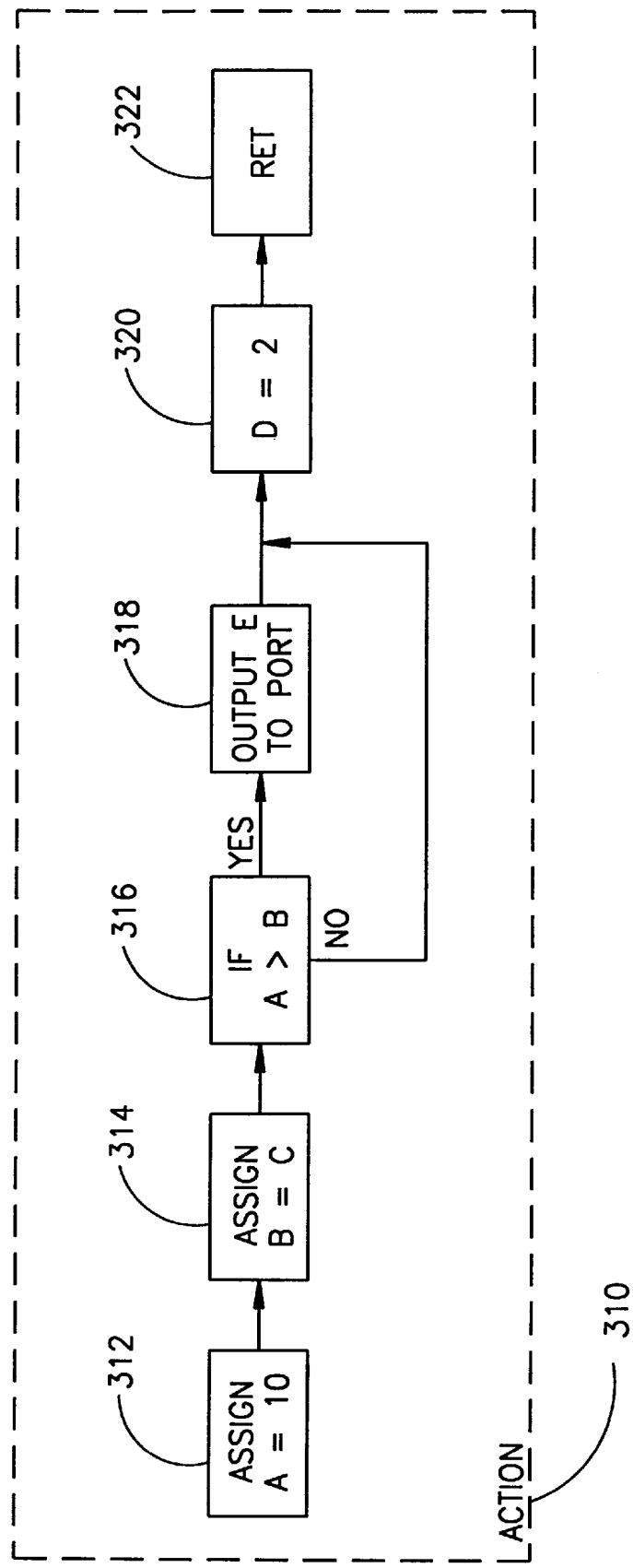
FIG. 16 is a high level block diagram illustrating an illustrative example of a frame implementing an action.

A high level block diagram illustrating an illustrative example of a frame implementing an action is shown in FIG. 16. The action 310 comprises six frames with the first frame 312 being an operation type frame. Frame 312 assigns the value 10 to the variable entity 'A'. Frame 314 assigns the value of variable 'C' to 'B'. The next frame 316 is a conditional type frame. If the value of variable 'A' is greater than that of 'B' control passes to frame 318 which outputs the value of variable 'E' to an output port. Alternatively, control passes straight to frame 320 which is an operation type frame which assigns the value 2 to the variable 'D'. The last frame 322 is a program logic type frame which performs a return function.

Figure 17:
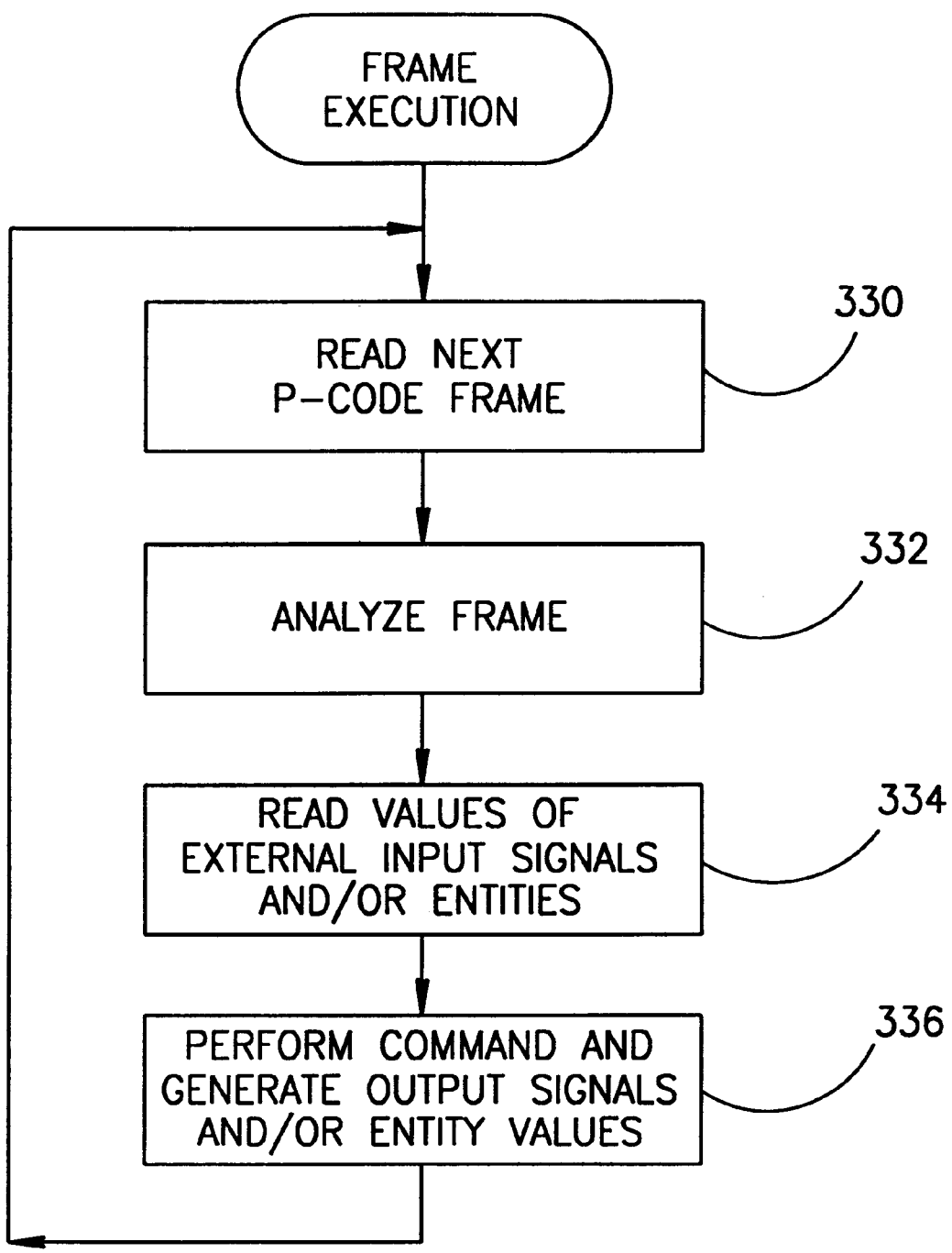
FIG. 17 is a high level flow diagram illustrating the execution sequence of a frame.

A high level flow diagram illustrating the execution sequence of a frame is shown in FIG. 17. The method of processing a frame begins with reading the p-code for the next frame to be executed (step 330). The frame is then analyzed in accordance with the instructions contained within the p-code (step 332). Any values of external input signals or internal entities, e.g., variables, timers, etc., that are needed to properly analyze the frame are then read (step 334). The command within the frame is then performed and the appropriate output signals or entity value changes are then generated in accordance with the command (step 336).

For example, the action taken by a frame may generate a digital or analog output signal, a motion control output, e.g., closed loop motion control, a change to a database entry, a message to be transmitted over the network, data to be displayed on the operator's console, etc.

The following is a list of commands that make up the frames of an action. These commands are executed by the action execution unit 216 (FIG. 11) in the real-time kernel.

Frame Commands

| | Command | Description |
|---|---|---|
| 1 | IF <condition>THEN <statements> ELSE <statements> END | conditional type frame command |
| 2 | CASE <entity> <value><statements> <value><statements> <value><statements> END | switch statement for choosing different action based on the value of a variable |
| 3 | FOR <var> = <value>TO <value> BY <value> <statements> END | construct for implementing loops |
| 4 | TRACE <entity> | trace command to show the values of entities, actions, formulas or subroutines |
| 5 | ASSIGN <entity> = <calculation formula> | assignment command for setting values to entities or ports |
| 6 | TIMER START/STOP | timer command with start and stop options |
| 7 | COUNTER RESET/START/UP/DOWN/NEXT | counter function with options to start, reset, count up, down, etc. |
| 8 | DELAY <value> | delays by specified amount of time |
| 9 | LABEL <identifier> | assigns a label to a command |
| 10 | JUMP <label> | jump to statement having specified label |
| 11 | DOSUB <sub name> | perform subroutine having sub name |
| 12 | BREAK <type> | stop execution according to break type |
| 13 | RETURN <value> | return from subroutine with specified value |
| 14 | DIGITAL OUTPUT ON/OFF <port> | set specified digital output port to either '0' or a '1' |
| 15 | ANALOG OUTPUT <port><value> | set specified analog output port to specified value |
| 16 | MOTION profile | includes motion function supplied by the motion control board |
| 17 | START MOTION <motion-name> | start a motion profile |
| 18 | STOP MOTION <motion-name> | stop a motion profile |
| 19 | EVENT <value=Stop/Abort/recovery> | return the axis event |
| 20 | MOTION STATUS | return the motion status |
| 21 | SET POSITION <axis><position> | dynamic axis position |
| 22 | GET POSITION <axis><position> | dynamic axis position |
| 23 | GET ERROR <axis><error> | dynamic axis position error planned as compared to actual |
| 24 | SET VELOCITY <axis><velocity> | dynamic velocity |
| 25 | GET VELOCITY <axis><velocity> | dynamic velocity |
| 26 | SET ACCEL <axis><velocity> | dynamic acceleration |
| 27 | GET ACCEL <axis><velocity> | dynamic acceleration |
| 28 | SET JERK <axis><velocity> | dynamic jerk |
| 29 | GET JERK <axis><velocity> | dynamic jerk |

Using the above listed commands, action frames can be generated that implement the user's application 182 (FIG. 10). More particularly, the frames making up the actions implement the combination of event triggers, event actions and the logic of the user's application. The real-time compiler 184 functions to generate the p-code that is utilized by the vent triggers evaluation module 212 and the action execution unit 216.

While the invention has been described with respect to a limited number of embodiments, it will be appreciated that many variations, modifications and other applications of the invention may be made.

What is claimed is:

1. A control automation system for controlling a plurality of input and output (I/O) devices in accordance with a user application, said system connected to a network for communicating control automation information, said system comprising:

a development system coupled to said network, said development system for generating p-code, said p-code generated so as to embody event triggers, event actions and program logic that together function to implement said user application; and at least one node controller coupled to said network for executing in real-time said p-code generated by said development system.

2. The system according to claim 1, wherein said node controller comprises:

processor means for managing and controlling the operation of said node controller, said processor means for executing a real-time kernel, said kernel implementing said user application embodied in p-code;

network interface means for connecting said node controller to said network;

I/O device interface means for connecting said node controller to said plurality of I/O devices; and bus means for interconnecting together said real-time kernel, said network interface means and said I/O interface means.

3. The system according to claim 1, wherein said development system comprises a real-time compiler for generating p-code in accordance with the event triggers, event actions and program logic of said user application.

4. The system according to claim 1, wherein said kernel means comprises:

an external input signal scanner for reading, storing and determining changes to external input signals received from said plurality of I/O devices;

an event triggers evaluation module for detecting changes to said external input signals and internal entities, said event triggers evaluation module for determining and resolving all event triggers corresponding to said detected changes;

a scheduler for marking all actions corresponding to said event triggers that resolve true;

an action execution unit for executing and implementing said actions marked for execution by said scheduler; and an entity processor for determining any changes to values assigned to an entity, said entity processor notifying said event triggers evaluation module of said entity value changes.

5. The system according to claim 1, wherein said I/O device interface means comprises a third party I/O interface control board.

6. The system according to claim 1, wherein said bus means comprises a bus contained in the group comprising Peripheral Component Interconnect (PCI) bus, VESA Local (VL) bus, V-bus, Industry Standard Architecture (ISA) bus, VersaModule Europa (VME) bus and Extended Industry Standard Architecture (EISA) bus.

7. A node controller apparatus for use in a control automation system, said system for controlling a plurality of input and output (I/O) devices in accordance with a user application, said system including a network for communicating control automation information, said apparatus comprising:

processor means for managing and controlling the operation of said node controller, said processor means for executing a real-time kernel, said kernel implementing said user application embodied in p-code;

network interface means for connecting said node controller to said network;

I/O interface means for connecting said node controller to said plurality of I/O devices; and bus means for interconnecting together said processor means, said kernel means, said network interface means and said I/O interface means.

8. The system according to claim 7, wherein said I/O device interface means comprises a third party I/O interface control board.

9. The system according to claim 7, wherein said bus means comprises a bus contained in the group comprising Peripheral Component Interconnect (PCI) bus, VESA Local (VL) bus, V-bus, Industry Standard Architecture (ISA) bus, VersaModule Europa (VME) bus and Extended Industry Standard Architecture (EISA) bus.

10. An apparatus for controlling a plurality of input and output (I/O) devices in accordance with a user application, said apparatus part of a control automation system, said apparatus comprising:

a processor operative to execute said user application;

I/O interface means for connecting said apparatus to said plurality of I/O devices;

kernel means adapted to communicate over a network and operative on said processor for:

reading, storing and determining changes to external input signals received from said plurality of I/O devices;

detecting changes to said external input signals and internal entities and for determining and resolving all event triggers corresponding to said detected changes;

marking all actions for execution that correspond to said event triggers that resolve true;

executing and implementing said actions marked for execution; and determining any changes to values assigned to an entity making notification of said entity value changes.

11. The apparatus according to claim 10, wherein said kernel means operative on said processor, in executing and implementing said actions marked for execution, further performs the steps of:

reading the p-code contents of a frame;

analyzing said p-code;

reading the values of external input signals and/or internal entities; and performing the command embodied in said p-code;

generating any output signals in accordance with said command; and modifying any entity values in accordance with said command.

12. In a computer system, a method of generating p-code for execution on a node controller as part of a control automation system for controlling a plurality of input and output (I/O) devices in accordance with a user application, said application including event triggers, event actions and program logic, said method comprising the steps of:

generating a plurality of pointer tables, each pointer table associated with either an external input signal or an entity, each pointer table comprising a plurality of pointer entries, each pointer entry pointing to an event trigger;

generating an event trigger table, said event trigger table comprising a plurality of event trigger entries, each event trigger entry corresponding to an action that references the particular external input signal or entity that points thereto;

generating a plurality of actions, each of said actions comprising at least one frame, said actions, said actions representing the generation of output signals and/or the modification of said internal entities; and wherein said plurality of pointer tables, said event trigger table and said plurality of actions generated in accordance with said event triggers, event actions and program logic making up said user application.

13. A node controller apparatus for use in a control automation system, said system for controlling a plurality of input and output (I/O) devices, said system including a network for communicating control automation information, said apparatus comprising:

a processor for managing and controlling the operation of said node controller;

network interface means for connecting said node controller to said network;

I/O interface means for connecting said node controller to said plurality of I/O devices;

bus means for interconnecting together said processor means, said network interface means and said I/O interface means; and kernel means adapted to communicate over said network and operative on said processor for:

reading, storing and determining changes to external input signals received from said plurality of I/O devices;

detecting changes to said external input signals and internal entities and for determining and resolving all event triggers corresponding to said detected changes;

marking all actions for execution that correspond to said event triggers that resolve true;

executing and implementing said actions marked for execution; and determining any changes to values assigned to an entity marking notification of said entity value changes.

14. A node controller apparatus for use in a control automation system, said system for controlling a plurality of input and output (I/O) devices in accordance with a user application, said system including a network for communicating control automation information, said apparatus comprising:

processor means for managing and controlling the operation of said node controller, said processor means for executing a real-time kernel, said kernel implementing said user application embodied in p-code;

network interface means for connecting said node controller to said network; and bus means for interconnecting together said processor means, said kernel means and said network interface means.

* * * * *